United States Patent [19]

Bui et al.

[11] Patent Number: 4,635,286
[45] Date of Patent: Jan. 6, 1987

[54] SPEECH-CONTROLLED ELECTRONIC WATCH

[75] Inventors: Ngoc C. Bui; Jean-Georges Michel, both of Neuchatel; Jean-Jacques Monbaron, Malvilliers, all of Switzerland

[73] Assignee: Asulab S.A., Bienne, Switzerland

[21] Appl. No.: 786,157

[22] Filed: Oct. 9, 1985

Related U.S. Application Data

[63] Continuation of Ser. No. 378,779, May 17, 1982, abandoned.

[30] Foreign Application Priority Data

Jul. 24, 1981 [CH] Switzerland .......................... 4827/81

[51] Int. Cl.$^4$ ................................................ G10L 1/00
[52] U.S. Cl. ........................................ 381/43; 368/73; 364/513.5
[58] Field of Search ................................... 381/41–43; 368/63, 73

[56] References Cited

U.S. PATENT DOCUMENTS

| 4,078,376 | 3/1978 | Freeman | 368/73 |
| 4,389,109 | 6/1983 | Taniguchi | 381/43 |
| 4,393,271 | 7/1983 | Fujinami et al. | 381/43 |

FOREIGN PATENT DOCUMENTS

| 1418958 | 12/1975 | United Kingdom. |
| 2064176 | 6/1981 | United Kingdom. |

OTHER PUBLICATIONS

Teja, "Voice Input and Output", EDN, Nov. 20, 1979, pp. 159-165.

Primary Examiner—E. S. Matt Kemeny
Attorney, Agent, or Firm—Spensley Horn Jubas & Lubitz

[57] ABSTRACT

Some at least of the control signals usually produced by manual control members and applied to the control circuit of the watch to control the performance of the different functions thereof are produced directly from words pronounced by the user, belonging to a predetermined vocabulary, by an assembly for producing control signals by means of speech, which comprises electro-acoustic means for converting a pronounced word into an analog signal representing that word, means for transforming the analog signal into an item of logic control information and means for transforming the logic information into a control signal which can be directly applied to a control circuit for controlling performance of the function corresponding to the word pronounced.

11 Claims, 25 Drawing Figures

| SIGNALS | | | MINSTR | No |
|---|---|---|---|---|
| S<br>1234567X | 111111<br>89012345 | 11112222<br>67890123 | | |
| 11111111B | 11110000B | 01010101B | RAM(ADRL) < DATA | 0: |
| 11101111B | 00111101B | 10110000B | A < PCL+1 | 1: |
| 11111011B | 00111100B | 01000001B | PCL < A | 2: |
| 10111111B | 00111000B | 01010101B | ADRH < DATA | 3: |
| 11111011B | 00111000B | 01010101B | PCL < DATA | 4: |
| 11111101B | 00111000B | 01010101B | PCH < DATA | 5: |
| 11111111B | 00111010B | 01010101B | PCL < DATA*CARRY | 6: |
| 11111111B | 00111000B | 01010111B | PCL < DATA*NOTCARRY | 7: |
| 11111111B | 11101100B | 01011101B | RAM(ADR) < INPUT | 8: |
| 11110111B | 01101100B | 01010101B | OUTPUT < RAM(ADR) | 9: |
| 11101110B | 01101101B | 10010101B | A < RAM(ADR)+B | A: |
| 11101110B | 01110101B | 10010101B | A < RAM(ADRL)+B | B: |
| 11011111B | 01101100B | 01010101B | B < RAM(ADR) | C: |
| 11011111B | 01110100B | 01010101B | B < RAM(ADRL) | D: |
| 11111111B | 11101000B | 01010101B | RAM(ADR) < DATA | E: |
| 01111111B | 00111000B | 01010101B | ADRL < DATA | F: |
| 01111111B | 01101100B | 01010101B | ADRL < RAM(ADR) | 10: |
| 11111011B | 01101100B | 01010101B | PCL < RAM(ADR) | 11: |
| 11111111B | 11101100B | 01000101B | RAM(ADR) < A | 12: |
| 11111111B | 11101010B | 01000101B | RAM(ADRL) < A | 13: |
| 11111111B | 11001100B | 01000101B | RAM(ADR2) < A | 14: |
| 11101110B | 01101100B | 11010101B | A < RAM(ADR) AND B | 15: |
| 11101110B | 01110100B | 11010101B | A < RAM(ADRL) AND B | 16: |
| 11101110B | 01101101B | 01010101B | A < RAM(ADR) OR B | 17: |
| 11101110B | 01110101B | 01010101B | A < RAM(ADRL) OR B | 18: |
| 11101110B | 01101100B | 01010101B | A < RAM(ADR) XOR B | 19: |
| 11101110B | 01110100B | 01010101B | A < RAM(ADRL) XOR B | 1A: |
| 11101110B | 01101100B | 10110101B | A < RAM(ADR) - B | 1B: |
| 11101110B | 01110100B | 10110101B | A < RAM(ADRL) - B | 1C: |
| 11101110B | 00110101B | 10110001B | A < ADRL + 1 | 1D: |
| 01111111B | 01011100B | 00000101B | ADRL < A | 1E: |
| 11101110B | 01101101B | 10110001B | A < RAM(ADR)+1 | 1F: |
| 11101110B | 00111101B | 00100001B | A < -A | 20: |
| 11011111B | 00111000B | 01010101B | B < DATA | 21: |

Fig.3

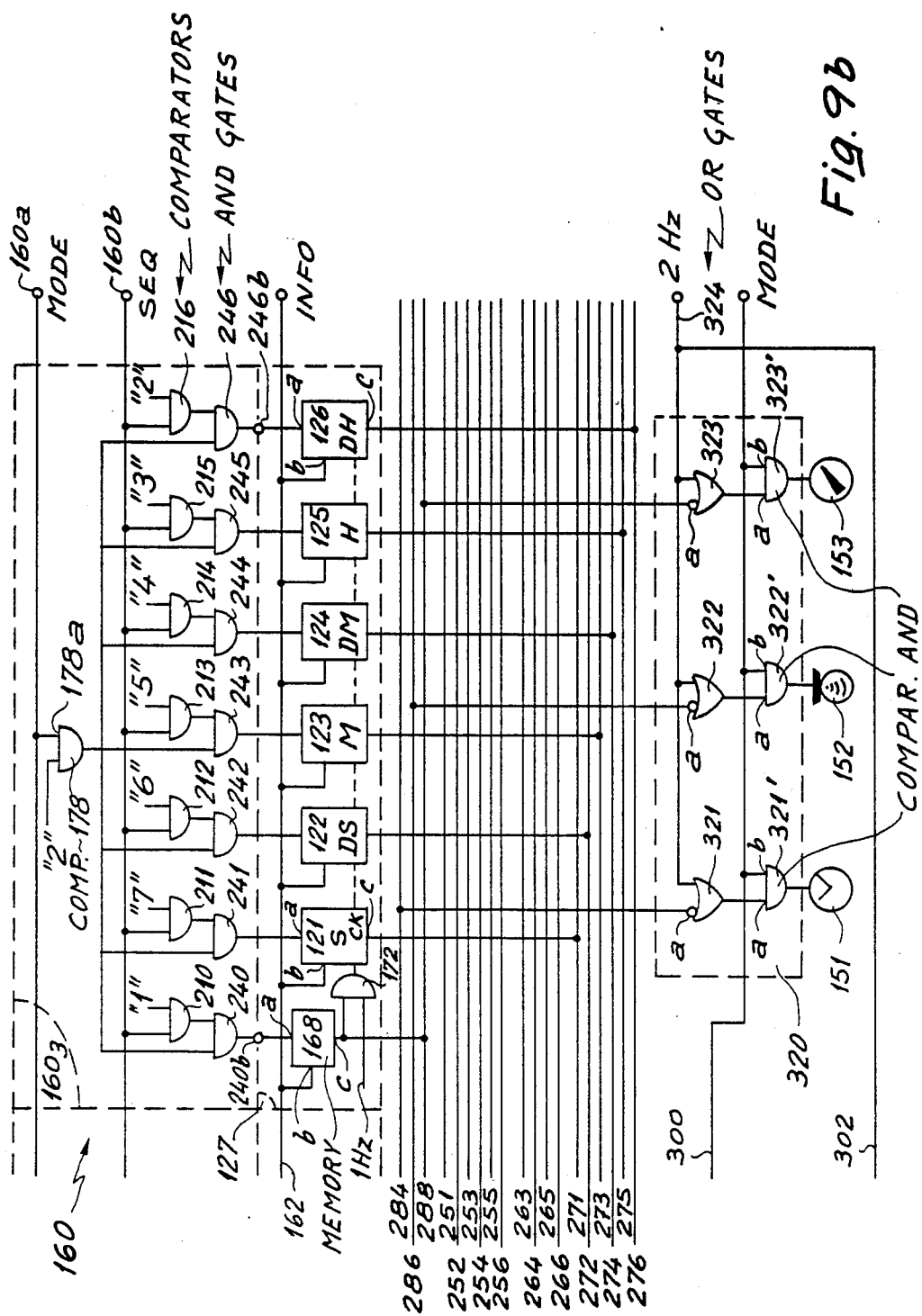

| SEQ | INFORMATION | |
|---|---|---|
| 0 | "MODE" | 0 - 2 (3) |
| 1 | STOP | 0 |
|   | START | 1 |
| 2 | DH | 0 or 1 |
| 3 | H | 0 - 9 |
| 4 | DM | 0 - 5 |
| 5 | M | 0 - 9 |
| 6 | DS | 0 - 5 |
| 7 | S | 0 - 9 |

| MODE | FUNCTIONS |
|---|---|
| 0 | WATCH |
| 1 | ALARM |
| 2 | TIMER |
| (3) | (TIME ZONE) |

Fig. 10

| No | PRONOUNCED WORD | DISPLAY |
|---|---|---|
| 1 | WATCH | 0 8 2 6 |
| 2 | — | 0 8 2 6 |
| 3 | STOP | 0 8 2 6 |
| 4 | START | 0 8 2 6 |
| 5 | — | 0 8 2 6 |
| 6 | ONE | 1 8 2 6 |
| 7 | — | 1 8 2 6 |
| 8 | SIX | 1 7 2 6 |
| 9 | SIX | 1 6 2 6 |
| 10 | — | 1 6 2 6 |
| 11 | — | 1 6 2 6 |

Fig. 11

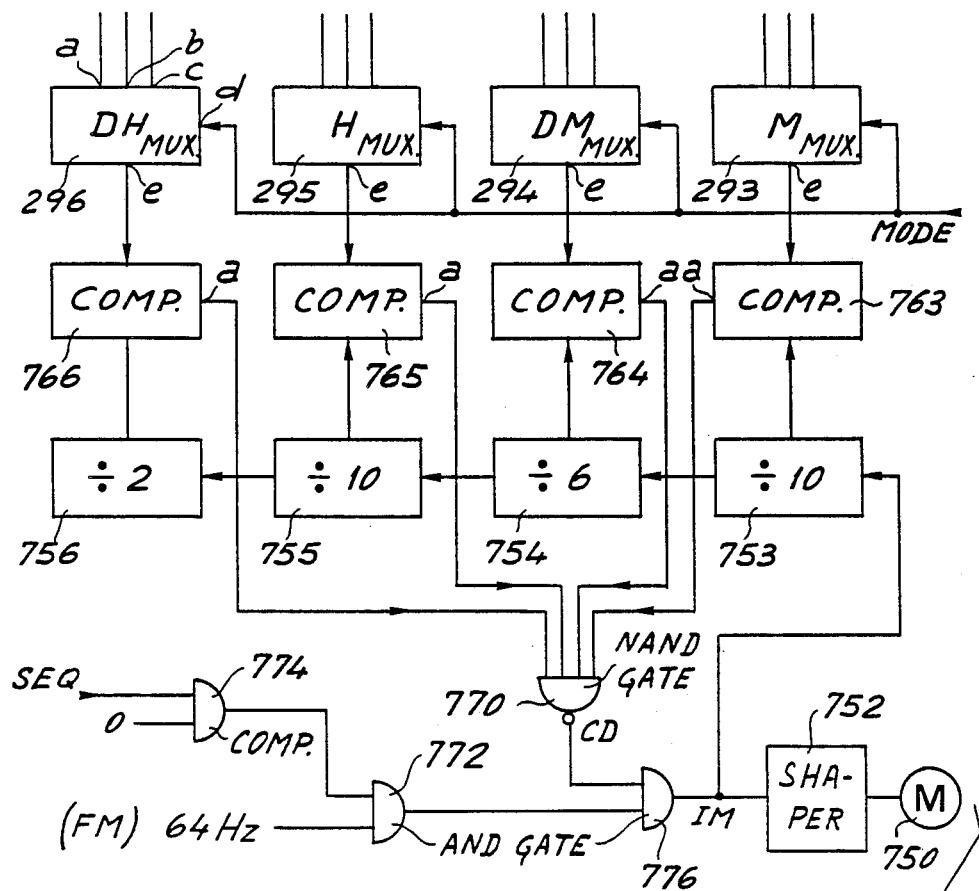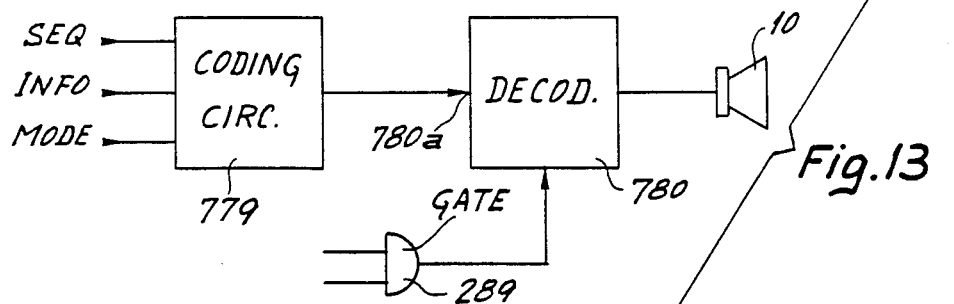
Fig.13

| MODE | INFO | DH+H<br>a | DM<br>b | M<br>c |
|---|---|---|---|---|
| 0 | x | 3 | 1 | 5 |
| 1 | x | 6 | 3 | 0 |
| 2 | x | 9 | 4 | 5 |
| 0 | 0 | 4 | 2 | 0 |
| 0 | 1 | 2 | 1 | 0 |
| 1 | 0 | 7 | 3 | 5 |
| 1 | 1 | 7 | 2 | 5 |
| 2 | 0 | 10 | 5 | 0 |
| 2 | 1 | 8 | 4 | 0 |

SPEECH-CONTROLLED ELECTRONIC WATCH

This is a continuation of co-pending application Ser. No. 378,779, filed on May 17, 1982, now abandoned.

BACKGROUND OF THE INVENTION AND PRIOR ART

The present invention relates to an electronic watch, and is concerned in particular with the means for controlling the watch.

Whether they are analog display watches or digital display watches, watches are controlled in most cases by means of movable members which are accessible to the user of the watch. Such members may be for example push-buttons or sliding and rotary stems. Such means for controlling a watch give rise to two series of problems.

The first problem concerns the control member itself. On the one hand, the control members project outwardly from the watch casing, and they are of dubious easthetic nature. Then, and in particular as the control members are movable, they give raise to technological problems which are difficult to overcome, taking into account the requirements in regard to sealing them, reliability and cost, particularly when they are to be used in relatively thin watches.

In an attempt to overcome these first problems, arrangements have been designed, which act as an electronic control circuit-breaker switch which is based on the principle of detecting either a change in capacitance or a change in resistance when the user places his finger at a given point on the glass or the casing of the watch. The disadvantage of a capacitive-action arrangement is that it consumes a great deal of electrical power. In fact, the capacitive divider including the capacitor which is variable depending on the position of the finger must have an alternating current passing continuously through it. A resistive-action system suffers not only from the disadvantage of a high level of power consumption but of being particularly sensitive to dirt which clings to the surface of the watch casing. It is therefore difficult to ensure that this arrangement operates properly.

The second series of problems is linked to the increase in the number of functions performed by a watch, in particular when it is a digital display watch. The main function of any watch of course is to show the time. A varying number of auxiliary functions is added to that main function. In the simplest case, the only auxiliary function is setting the time shown by the watch. In fact this correction function covers two situations, either when the function involves altering the watch to set it to the correct time, in which case the correction involved is a few seconds or a few fractions of a minute per month, or changing the time zone shown by the watch, as required. A widely varying number of other auxiliary functions may be added to the above-discussed auxiliary function which is strictly necessary. Mention may be made of alarm or awakening functions which trigger for example a bell or buzzer when the watch reaches a pre-selected alarm time; a chronograph function with many variations; or yet again, a function involving starting a count-down or timer function. In order to carry out some of those functions, the watch simply has to be given an instruction in order to set the watch into a desired mode of operation. This is the case for example with the chronometer function. In other cases, not only must the watch be put into the desired mode of operation but in addition the watch must be supplied with digital data in order for the desired function to be introduced in its entirety. This is the case with changing the time zone, and it is also the situation involving introducing an alarm time, etc.

In order to control these different functions, that is to say, in order to introduce the different corresponding instructions into the watch by means of push-buttons or similar mechanisms, it is necessary either to multiply the number of push-buttons or to arrange for each control member to occupy a number of active positions which make it possible to make a distinction between the input of several different instructions, or yet again a combination of those two arrangements.

Where the watch includes a fair number of functions, such handling operations are tiresome for the user and give rise to the danger of causing many errors, more particularly when dealing with functions which are rarely used. Even when dealing with just the time setting function, it is necessary to make a distinction between an operation of correcting the minutes and an operation of correcting the hours. This distinction is often made on the basis of the period of time for which a push-button is actuated. It will be seen at once that a substantial number of errors or improper actuating operations may occur.

Another solution is proposed in Swiss Pat. No. 621 460. This solution comprises providing the watch with a microphone which receives a sound signal for controlling the functions of the watch. However, the sound signal must be coded in a highly precise manner in order for the electrical signal supplied by the microphone to form a coded signal which can be used directly by the watch. It will be seen therefore that the watch can be controlled only if this coded signal sound source is available. This greatly limits the freedom of controlling the watch and the real application of such a control system is actually limited to setting the time shown by the watch.

The said Swiss Patent also describes the possibility of stopping the alarm of the watch by a verbal instruction. In actual fact, that verbal instruction is unique since there is only one function to be controlled, namely stopping the alarm. In actual fact therefore, that verbal instruction is entirely comparable to a noise emitted by the person using the watch. Therefore, that solution is only a very partial solution and in no way overcomes the problem involved.

BRIEF SUMMARY OF THE INVENTION

To remedy those disadvantages, a first object of the present invention is to provide an electronic watch wherein control of the functions is simple from the point of view of the user, even if the watch has a high number of functions, and which does not require any particular exercise of the memory.

A second object of the invention is to provide such an electronic watch in which the number of movable control members is greatly reduced, or even totally eliminated.

A third object of the invention is to provide such an electronic watch in which the control members which project out of the watch casing are reduced or even eliminated without thereby having recourse to resistive or capacitive control systems.

In order to attain those aims, the invention involves controlling the watch directly by speech. In other words, the user pronounces conventional words in front of the watch, each word being associated with a function of the watch or a set of data necessary for carrying out that function. In other words, the manual control means used to produce control signals for actuating the control circuit of the watch is replaced by a device for introducing words which will serve as control signals for controlling the control circuit of the watch.

More precisely, the watch according to the invention comprises means for producing control signals and for applying said signals to the control circuit in order to control at least two functions of the watch. The control signal production means comprise electro-acoustic means for converting a word pronounced by the user into an analog signal representing the word pronounced, means for transforming that analog signal into logic control information and means for transforming the logic information into a control signal for controlling performance of the function corresponding to the word pronounced, by said control means.

It will thus be clearly seen that at least some of the control signals which are conventionally produced by manual control members, in accordance with the invention, are directly produced by the watch from words pronounced by the user. Those words, which are limited in number, constitute the vocabulary of the watch and permit control in respect of at least some functions of the watch. Such an arrangement clearly overcomes the two main problems concerned. On the one hand, the watch now has only a reduced number of manual control members or even no longer has any such members, and on the other hand, it is easy to choose for each control word, a word whose sense is directly associated with the function to be controlled or the information to be introduced. For example, it would be possible to use words such as wake and chrono and, for the data required, the figures themselves, which therefore eliminates any need for exercizing the memory. There is no longer any need for the user to remember by heart the method of using the watch.

Preferably, the means for transforming the analog signal into a control information comprise means for coding the analog signal in digital form, thereby giving a digital word-coding signal, means for memorizing in that coded digital form a plurality of words which are associated with the different functions of the watch and which will be referred to hereinafter as references, means for comparing the coded digital signal repesentative of the word pronounced to at least a part of said references and means for selecting the reference which is closest to the coded digital signal, the reference which is thus selected giving the control information which will be transformed into a control signal for the control circuit of the watch.

In other words, the watch contains in its memory, digital informations or references corresponding to the different words of the vocabulary of the watch which are required to control the watch, such words obviously being coded using the same algorithm as that which is used to code the words pronounced by the user. When a word pronounced by the user has been coded, it is compared with at least a part of the memorized references and the watch retains the reference, the coding of which is closest to that of the word pronounced. The digital information corresponding to the reference which is selected in that manner is converted into a control signal which is applied to the control circuit of the watch.

It will be clear that this manner of controlling the watch with words is basically different from control using "noises". In fact, even if in both cases there is an electro-acoustic transducer and if in both cases the human voice is used either to pronounce a word or to emit a noise, the structure of the two corresponding types of watch is greatly different. When words are used, the watch must make a distinction between several words. The noise is strictly the equivalent, in sound form, of the pressures applied to a conventional push-button.

BRIEF DESCRIPTION OF THE DRAWINGS

Other features and advantages of the invention will be more clearly apparent from the following description of a number of embodiments of the invention which are given by way of non-limiting example with reference to the accompanying drawings in which:

FIG. 3 shows the table for coding of the microinstructions of the program of the microprocessor;

FIGS. 9a and 9b show a first embodiment of the control circuit of the watch according to the invention;

FIG. 10 shows two tables illustrating the correspondence between the digital value of the control signal and the information contained in those signals;

FIG. 11 shows an operating sequence of the watch according to the invention;

FIG. 13 shows a third embodiment of the control circuit of the watch;

DETAILED DESCRIPTION OF PREFERRED EMBODIMENTS

Figure 1:
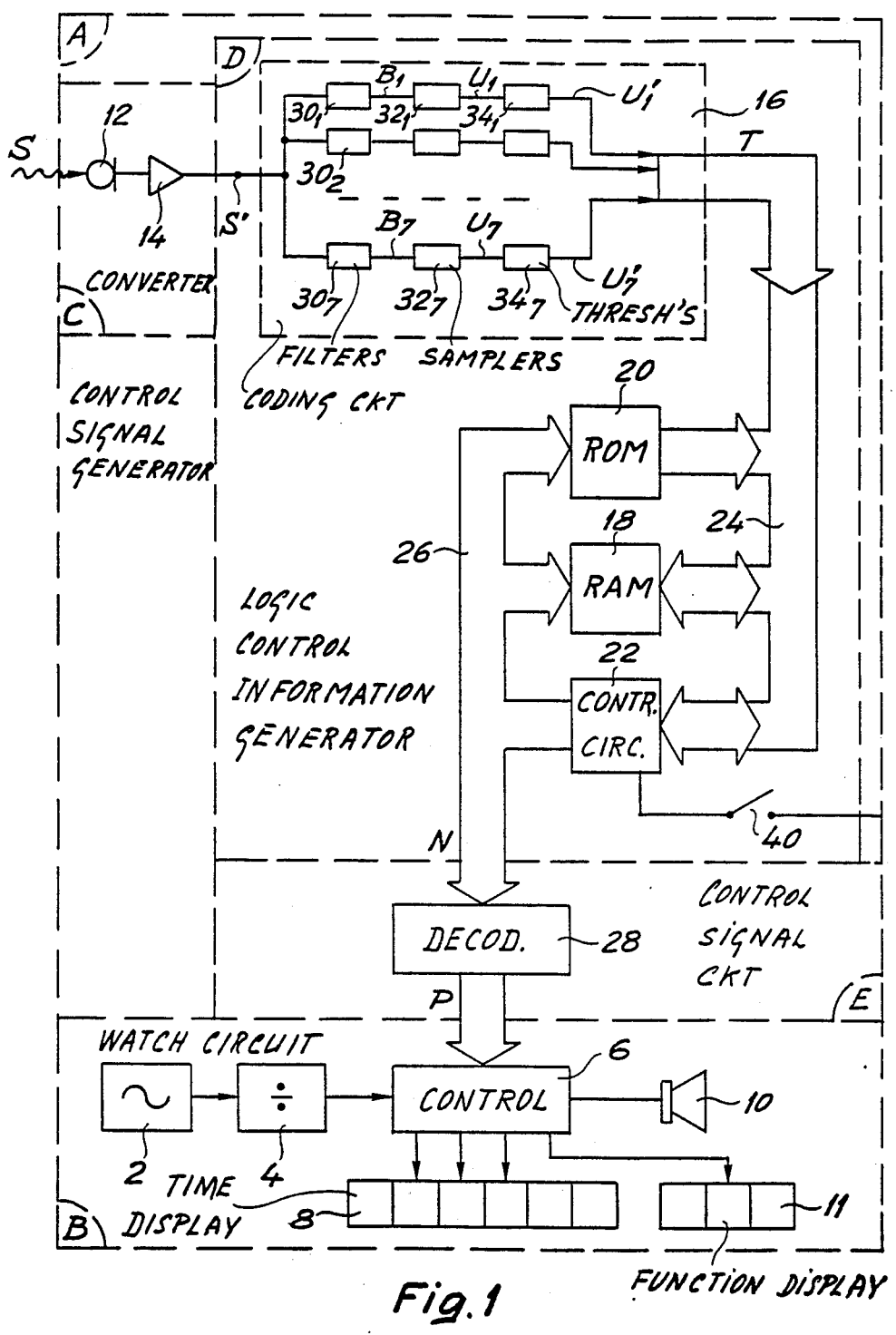
FIG. 1 shows a simplified general view of the whole of the watch, more particularly illustrating the means for introducing and identifying a code word.

A shown in FIG. 1, the watch according to the invention essentially comprises an assembly A for producing control signal by means of speech and a watch circuit B for displaying the time and in most cases other functions on the basis of the control signal produced by the assembly A. The part B of the watch comprises a time base generator 2 which is for example a quartz oscillator producing a signal at a frequency of 32 kHz; a divider 4 formed by several divider stages and producing signal of different frequencies at its outputs; a control circuit 6 which receives, on the one hand, the trains of pulses at different frequencies and, on the other hand, the control signals; display means 8 which are controlled by the control circuit 6 and which comprise for example six display elements. The part B of the watch further comprises a loudspeaker 10 which serves for example to emit an alarm signal, and display means 11 for showing the function of the watch in question.

The control signal producing assembly A can in turn be subdivided into electro-acoustic converter means C which transform the sound signal S spoken by the user into an analog signal S' which represents the sound signal S; a circuit D for producing logic control information, which converts the analog signal S' into digital information N representing the sound signal S; and finally, a circuit E for producing control signals, which transforms the information N into control signals P which can be directly applied to the control circuit 6 to control operation of the watch.

The electro-acoustic converter means C essentially comprise a microphone 12 and a pre-amplifier 14 having a gain of about 100, which is suitable for the output of a microphone. In addition, it accentuates the high frequencies up to 3 kHz, with a slope of 20 decibels per decade.

The circuit D essentially comprises a coding circuit 16 which transforms the analog signal S' into a digital coding signal T, means 18 for memorizing the different digital coding signals supplied by the circuit 16, means 20 for memorizing digital information, each item of digital information corresponding to one of the words of the vocabulary which are required for controlling the watch, such digital information being referred to hereinafter as references, and other data required for operation of the circuit; and a circuit 22 for controlling the memories 18 and 20 and for making a comparison between the digital signal coding a word pronounced by the user, and the different references contained in the memory 20. This comparison process will be described hereinafter. It will be appreciated that buses denoted generally by reference numeral 24 connect the output of the coding circuit 22, and the memories 18 and 20 to the control circuit 22. Likewise, a bus denoted by general reference numeral 26 connects the output of the control circuit 22 to the inputs of the memories 18 and 20 and to the input of logic control circuit E for producing the control signals.

The circuit for producing the control signals essentially comprises a decoder 28 which makes it possible to associate with each item of control information N representing a word, a corresponding control signal P for exampel in binary form, which can be applied directly to the control circuit 6.

FIG. 1 also shows in detail a possible embodiment of the coding circuit 16. This circuit comprises N' band pass filters 30 which simultaneously filter the analog signal S'. There are for example seven filters denoted by reference numerals $30_1$ to $30_7$. The filters cover the whole of the frequency range containing the useful information in the spoken words.

Each filter 30 supplies at its output a filtered analog signal $B_1$ to $B_7$ corresponding to the fraction of the signal S' contained in each pass band. The outputs of the filters 30 are respectively connected to the inputs of seven sampling circuits respectively denoted by reference numerals $32_1$ to $32_7$. The circuits 32 produce at their output the mean value of the associated analog signal S' during the sampling period which is for example 10 ms. At their output, the circuits 32 supply sampled analog signals $U_1$ to $U_7$ which respectively correspond to the filtered analog signals $B_1$ to $B_7$. The signals $U_1$ to $U_7$ are introduced into threshold circuits $34_1$ to $34_7$. At their output, the circuits 34 produce a logic signal at level "1" if the signal applied to their input is higher than the threshold and a logic signal at level "0" if the opposite is the case. The threshold may be fixed or preferably may be a function of the mean value of the samples supplied by the seven filtering channels. Such a circuit is described for example in published British Patent Application GB No. 2,084,835, or pending U.S. application Ser. No. 305,277.

Therefore, each signal U' represents in binary form the amplitude variations as a function of time of the sound signal S in respect of one of the filtering bands. If in contrast, the seven signals U' are considered at a given sampling moment, that group of signals forms a binary number having seven binary positions, representing the frequency specturm of the sound signal at the moment in question. The group of seven signal U' corresponding to a word pronounced therefore constitutes coding of that word in the form of a matrix table, one side of which would represent the time axis and, the other side, would represent the numbers of the different filtering channels. That group does in fact constitute code T of the word pronounced. It will be appreciated that the signal T actually comprises a certain number of "words" having seven binary positions. The number of "words" is subsequently adjusted to a fixed number of samples provided to standardize the words pronounced. For example, the total number of samples is reduced to sixteen. It is these items of information which are stored in the memory 18, possibly after processing to reduce the number of items of information. It will be appreciated that the references contained in the memory 20 are formed by digital coding signals which are of the same nature as the signal T. In other words, the coding process in respect of such references is the same as that which is used to process the code words pronounced by the user.

The highly simplified mode of operation of the watch is as follows: the user actuates a change-over switch 40 to set the watch into the listen mode. He then pronounces the word of the vocabulary which corresponds to the function to be controlled. The sound signal is coded to give a digital coding signal which is stored in the memory 18. The control circuit 22 compares the digital binary coding signal associated with the word pronounced to all the references contained in the memory 20 by means of a correlation algorithm used by the circuit 22. The circuit 22 selects the reference which is closest to the coded word. The item of control information corresponding to the word recognized by the circuit 22 is applied to the input of the circuit 28 which produces a signal P which is applied to the control circuit 6. The control circuit, in response to the control signal P, will display a corresponding item of information on the display means 8 or 11. If the user sees that the word pronounced has been properly recognized by the watch, he introduces the following word of the sequence of instructions. If the word displayed by the watch is wrong, the user will have to correct it.

Figure 2:
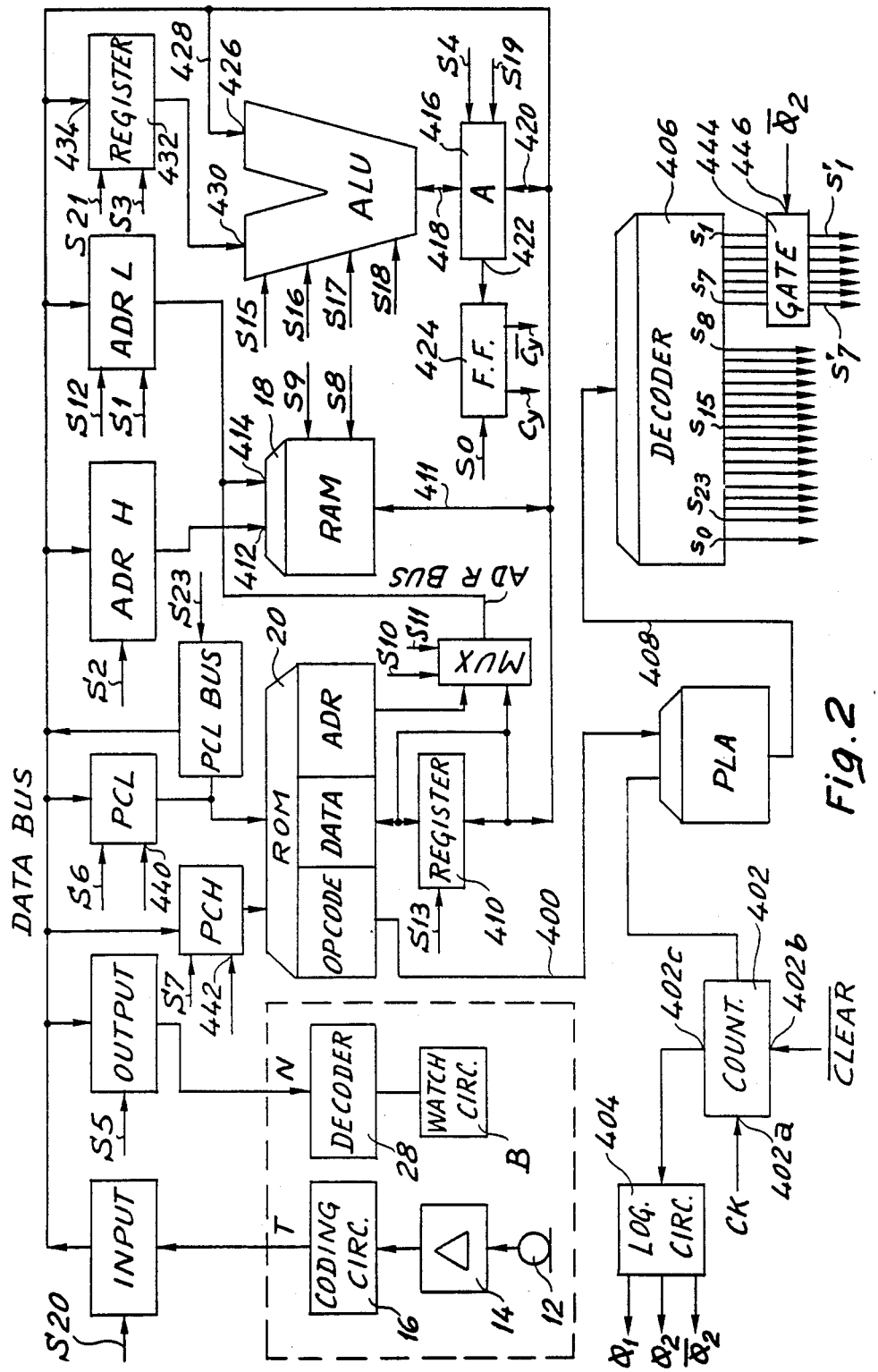
FIG. 2 shows the whole of the microprocessor for coding and memorizing the word pronounced by the user.

FIG. 2 shows the structure of the microprocessor for transforming the binary signals T issuing from the coding circuit 16 into digital signals N which are applied to the input of the decoder 28. It will be appreciated that the microprocessor comprises the read only memory or ROM 20, the random access memory or RAM 18 and the assembly of processing units which are indicated generally by reference numeral 22 in FIG. 1.

The output of the coding circuit 16 is applied to an input register indicated by INPUT and provided with the clock input $S_{20}$. The output of the input register is connected to a data bus, indicated by DATA BUS. The data bus comprises for example eight lines in parallel. Likewise, the input of the decoder 28 receives the signal N of an output register, indicated by OUTPUT, which comprises a clock input $S_5$ and the data input of which is connected to the data bus.

Coming back to the memory 20, it will be seen that it comprises a first field indicated by OPCODE and which contains the instructions of the program that the microprocessor performs, a data field indicated by DATA and which contains the references in coded form of the words of the vocabulary and the parameters used in the microprocessor program, and an address field indicated as ADR. The output of the field OPCODE of the memory 20 is connected by the parallel lines 400 to inputs of a programmable logic array indicated at PLA. Other inputs of the array PLA receive the output signal of a counter 402, the clock input 402a of which receives the clock signal CK and which can be set to zero by the input 402b. Another output 402c of the counter 402 is connected to the input of a logic circuit 404 which produces the synchronization signals $\phi_2$ and $\bar{\phi}_2$ and the transfer signals $\phi_1$. The output of the array PLA is connected to the input of a dcoder circuit 406 by the parallel lines 408. At its outputs $s_0$ to $s_{23}$, the decoder circuit 406 produces control signals which are directly or indirectly applied to the control or clock inputs of the different elements of the microprocessor. Each instruction of the program, which is contained in the field OPCODE of the memory 20 and which is passed to the array PLA, is converted into a variable sequence of micro-instructions, as will be described in greater detail hereinafter. Each micro-instruction from the array PLA, which is applied to the input of the decoder 406, is converted into twenty four binary logic signals supplied at the outputs $s_0$ to $s_{23}$ of the decoder. The table for conversion between the micro-instructions and the signals appearing at the outputs will be set out hereinafter. The data field of the memory 20 is connected to the DATA BUS by way of an isolating register 410 comprising a control input $S_{13}$. The address field ADR of the memory 20 is connected to the address bus, indicated by ADR BUS, by a multiplexer MUX. The output of the DATA field is also connected to one of the inputs of the multiplexer MUX. The multiplexer MUX comprises a selection input $S_{10}$ and an output control input $S_{11}$. In other words, the data field DATA can be connected either to the DATA BUS or to the ADR BUS. The RAM 18 is intended to contain inter alia the information relating to the word which has been pronounced and coded by the circuit 16. The memory 18 is connected to the DATA BUS by lines in parallel (for example eight), indicated at 411. The memory 18 also comprises a readwrite input $S_8$ and a write selection input $S_9$. In addition, the memory 18 has addressing inputs 412 and 414. The input 412 is connected to the address register ADRH while the input 414 is connected to the ADR BUS. The latter bus is connected to the input of a second address register ADRL. The address registers ADRH and ADRL are also connected to the DATA BUS. The register ADRH comprises the clock input $S_2$ while the register ADRL comprises the clock input $S_1$ and the output control input $S_{12}$.

The address input of the RAM can therefore receive items of information either from the multiplexer MUX or from the register ADRL. The input 412 serves for addressing the instructions contained in a page of that memory whereas input 414 is used for addressing the instructions embodied in each page of that memory.

The microprocessor also comprises an arithmetic and logic unit ALU comprising the control inputs $S_{15}$, $S_{16}$, $S_{17}$ and $S_{18}$. The unit ALU is associated with an accumulator 416 connected to the unit ALU by the parallel lines 418. The accumulator 416 is also connected to the DATA BUS by parallel lines 420. The accumulator 416 comprises the clock input $S_4$ and the output control input $S_{19}$. It further comprises an output 422 which is connected to a flip-flop 424 for storing the carry. The flip-flop also has a clock input $S_0$. The flip-flop 424 supplies the carry signals $C_y$ and $\bar{C}_y$.

The input 426 of the unit ALU is connected by parallel lines 428 to the DATA BUS. Another input 430 of the unit ALU is connected to the output of the operand register 432. The input 434 of that register is connected to the DATA BUS. The register 432 also comprises a clock input $S_3$ and an output control input $S_{21}$.

Addressing in the memory 20 is effected by two registers operating as program counters PCH, PCL and the register PCL BUS. The inputs of the counters PCH, PCL are connected to the DATA BUS whereas their outputs supply the address inputs of the memory 20, the output of the register PCL also being connected to the input of the register PCL BUS. The counters PCL and PCH comprise clock inputs $S_6$ and $S_7$ and zero resetting inputs 440 and 442. The register PCL BUS comprises an output control input $S_{23}$. The purpose of this is to return on the DATA BUS the content of the register PCL which is to be incremented by the unit ALU for each fresh instruction.

If reference is now made again to the decoding circuit 406, it will be seen that the signals supplied by the outputs $s_1$ to $s_7$ thereof are applied to a logic gate 444 provided with the control input 446 to which the signal $\bar{\phi}_2$ is applied. The only effect of this circuit is to synchronize the signals supplied at the outputs $s_1$ to $s_7$ of the circuit 406, with the signal $\bar{\phi}_2$. The outputs of the circuit 444 are indicated at $s'_1$ to $s'_7$.

Figure 2A:
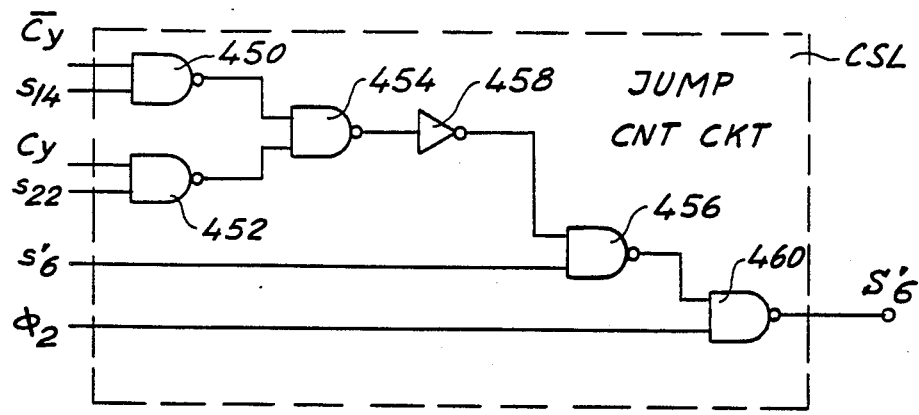
FIGS. 2a to 2c show logic circuits associated with the microprocessor in the strict sense.
Figure 2B:
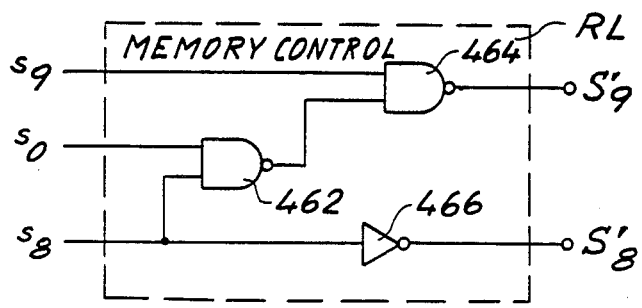
Figure 2C:
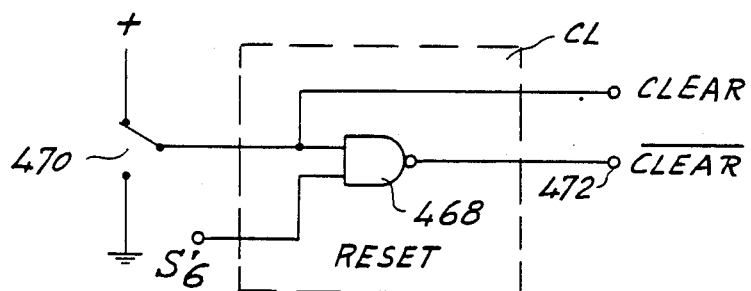

The microprocessor also includes three logic circuits for processing the control signals, as shown in FIGS. 2a, 2b and 2c. The circuit indicated at CSL in FIG. 2a is a conditional jump control circuit which brings in the value of the CARRY. The circuit CSL comprises a first NAND-gate 450 which at its inputs receives the signal $\bar{C}_y$ supplied by the carry circuit 424 and the signal supplied by the output $s_{14}$ of the coding circuit 406. A second NAND-gate 452 receives at its inputs the signal supplied by the output $s_{22}$ of the circuit 406 and the signal $C_y$ supplied by the carry circuit 424. The outputs of the gates 450 and 452 are applied to a third NAND-gate 454, the output of which is applied to one of the two inputs of a NAND-gate 456 by way of an inverter 458. The second input of the gate 456 receives the signal supplied by the output $\bar{s}_6$ of the circuit 444. Finally, another NAND-gate 460 receives on one input the signal supplied by the gate 456 and on the other input, the signal $\phi_2$ supplied by the logic synchronization circuit 404. The output of the gate 460 is indicated by reference $S'_6$.

The circuit RL in FIG. 2b is a logic circuit for controlling the memory 18 and circuit comprises a NAND-gate 462 which on its inputs receives the signals supplied by the outputs $s_8$ and $s_0$ of the decoding circuit 406. The output of the gate 462 is connected to an input of a NAND-gate 464 which on its input receives the signal supplied by the output $s_9$ of the circuit 406. The output of the gate 464 is indicated by reference $S'_9$. The circuit RL also comprises an inverter 466 which on its input receives the signal supplied by the output $s_8$ of the circuit 406. The output of the inverter is indicated by $S'_8$.

Finally, the circuit CL is a zero resetting circuit. It is formed by a NAND-gate 468, one input of which is connected to the output of a circuit 470 while the other input is connected to the output $S'_6$ of the circuit CSL. The purpose of the circuit 470 is simply to supply an initialization pulse when the power source is set in place in the watch. The output 472 of the gate 468 supplies the zero resetting signal $\overline{CLEAR}$ which is applied to the zero resetting input $402_b$ of the counter 402, while the signal CLEAR which is directly supplied by the change-over switching means 470 is applied to the zero resetting inputs 440 and 442 of the program counters PCL and PCH.

The outputs $s_{10}$ to $s_{23}$ are directly connected to the corresponding control inputs $S_{10}$ to $S_{23}$ of the elements of the microprocessor. Likewise, the outputs $s'_1$ to $s'_5$ and $s'_7$ of the circuit 444 are connected to the corresponding control inputs $S_1$ to $S_5$ and $S_7$ of the elements of the microprocessor. Finally, the output $S'_6$ of the circuit CSL is connected to the control input $S_6$ of the register PCL and the outputs $S'_8$ and $S'_9$ of the circuit RL are connected to the inputs $S_8$ and $S_9$ of the random access memory 18.

Having described the construction of the microprocessor, we shall now describe the logic operation thereof.

FIG. 3 shows the table in respect of correspondence between the micro-instructions (MINSTR) used for programming the microprocessor and the binary values of the signals applied to the control inputs $S_0$ to $S_{23}$ of the different elements of the microprocessor to control the execution of those instructions. The left-hand part of the table shows the binary value of each of the signals for the different micro-instructions (MINSTR), the center column shows the written micro-instructions in symbolic form, while the right-hand column shows the number of the micro-instructions.

The sign "<" is used as a left arrow to indicate that the right-hand item of information is introduced into the left-hand element, optionally with the indication of an address when the memory 20 is involved, which is then denoted by RAM. In addition, DATA symbolizes an item of data contained in the read only memory 18; ADR denotes an address in the memory 18; CARRY denotes the carry signal and NOT CARRY denotes the opposite signal; A denotes the accumulator 416 or the informations that it contains; and B denotes the register 432 or the information that it contains.

For example, the micro-instruction 00 comprises putting into the memory 20 at the address contained in the address register ADRL the information DATA contained in the memory 20. Instruction 01 comprises incrementing by 1 the content of the register PCL and introducing that value into the accumulator A. The instruction 06 involves transferring into the program counter PCL the carry of the information DATA. The instruction 09 comprises transferring into the output register OUTPUT the information contained in the memory 20 at the address ADR.

The instruction 16 comprises performing the logic operation AND between the content of the register B and the information contained in the memory 20 at the address corresponding to the content of the address register ADRL and transferring that result into the accumulator A. The instructions 18 and 1A are identical to the instructions 16 but with the logic operation AND being replaced respectively by the operation OR and EXCLUSIVE OR. The other instructions will be readily understood from the foregoing explanation, and there is therefore no need for them to be explained in further detail.

These micro-instructions define the base transfer operations of the microprocessor. The micro-instructions (MINSTR) are combined to define more complex operations forming the instructions on the basis of which the program of the microprocessor is produced.

The first instruction is entitled LDI A8, D8. It comprises a transfer of the value of the field DATA from the memory 20 (ROM) into the RAM at an address position established by the field ADR of the ROM. It comprises a sequence of three base transfers, namely the transfer of those data into the RAM addressed by the field ADR; transfer of the state of the register PCL into the accumulator A and incrementation thereof; with the third transfer being the return of that incremented value into the register PCL (micro-instructions OEH, OIH and O2H in hexadecimal code).

The second instruction of the processor is an indirect transfer entitled LII, A8, D8. Its definition is RAM(-RAM(D8))<RAM (RAM(A8)). This instruction comprises a sequence of the following eight base transfers: loading the address register ADRL with the value of the field DATA in the ROM; transfer of the content of the RAM which is thus indicated into the accumulator A; transfer of the content of the accumulator into the address field of the RAM, transfer of the content of the RAM addressed by ADRL into the accumulator; transfer of the content of the RAM addressed by the field ADR of the ROM into the register ADRL; transfer of the content of the accumulator to that memory position in the RAM; with the last two transfers comprising, as in regard to the preceding instruction, incrementing the PCL (MINSTR OF, OB, IE, 10, 13, 01, 02). The following instruction which is a direct transfer of position RAM to position RAM(D8) into RAM(A8). This instruction can be carried out in five stages: first at all, loading of the address D8, that is to say DATA into ADRL; then, the content of the RAM which is thus indicated is transferred temporarily into the accumulator; the third stage involves transferring the content of the accumulator into the RAM indicated by ADR; while the last two stages serve to increment the PCL (MINSTR OF, OB, IE, OB, 10, 13, 01, 02). The following instruction which is a direct transfer of position RAM to position RAM is entitled LDD, A8, D8 and comprises a transfer of RAM(D8) into RAM(A8). This instruction can be carried out in five stages: first of all, loading of the address D8, that is to say DATA into ADRL; then the content of the RAM which is thus indicated is transferred temporarily into the accumulator; the third stage involves transferring the content of the accumulator into the RAM indicated by ADR; while the last two stages serve to increment the PCL (MINSTR OF, OB, 12, 01, 02).

The following instruction LID A8, D8 is a transfer of the RAM into the RAM, the address of the source of which is direct and the address of the destination of which is indirect. It is therefore entitled RAM(D-8)<RAM(RAM(D8)). The succession of transfers which permit this instruction to be carried out corresponds to the micro-instructions OF, OB 10, 13, 01, 02. With regard to the following instruction JMP D8, this is an unconditional jump instruction which comprises the transfer D8>PCL: that is to say, it is the content of the field DATA which goes into register PCL, which corresponds to a program jump (micro-instructions 4). The following instruction JC, D8 is the same instruction as the preceding one, except that it is conditional. In fact, it is the value of the CARRY which makes it possible to perform this transfer operation, that is to say, if the CARRY is of a value of "1" the transfer is performed while if the CARRY is "0", the transfer ist not made and it is the normal instructions for incrementing the register PCL which occur. An important point should be noted here. The logic circuit CSL of FIG. 2a is so constructed that, whenever an instruction JMP is carried out, the counter 402 in FIG. 2 is reset to zero. In other words, the instructions for incrementing the register PCL cannot be performed and it is the instruction to which the jump is made, which begins to be carried out.

It will be appreciated that the complete program involves other instructions defined on the basis of the micro-instructions. These other instructions will not be described in detail herein as they are within the capability of those skilled in the art, on the basis of the instructions already described.

Having described the structure and the mode of operation of the microprocessor, we shall now describe the program for controlling the processor, with reference to FIGS. 4 to 7.

Figure 4:
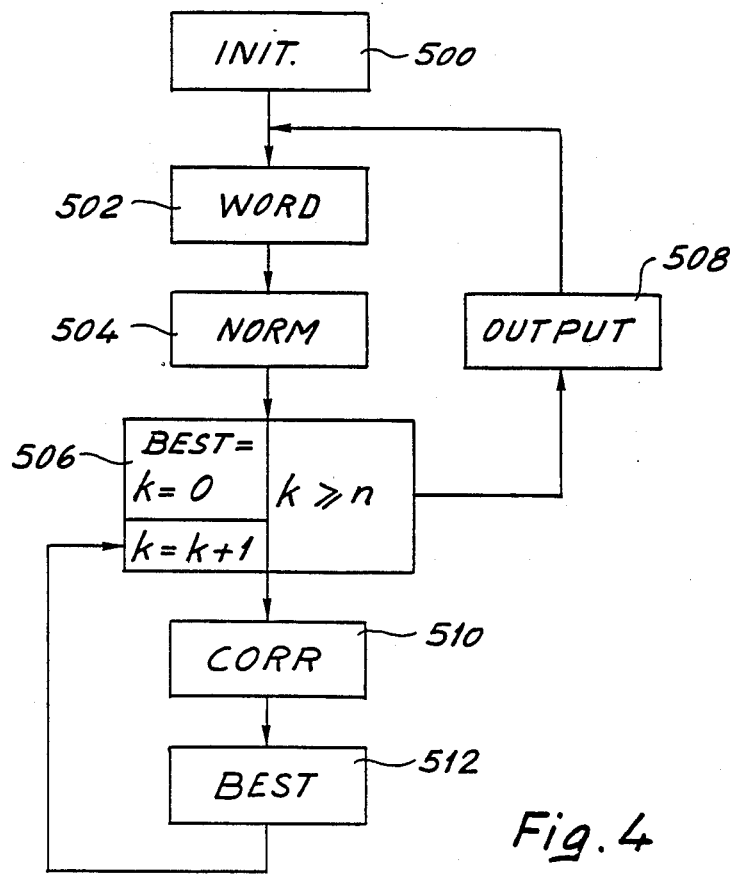
FIG. 4 shows a simplified view of the algorithm of the whole of the program of the microprocessor.

FIG. 4 shows in a simplified form the algorithm of the program. It first of all comprises an initialization subprogram 500 "INIT" the purpose of which is to control the transfer of the data relating to the words of the vocabulary or "references" of the watch which have been initially introduced. These items of information are transferred from the field DATA of the read only memory 20 into the random access memory 18 to permit such information to be processed. It then comprises a subprogram 502 for coding the binary information supplied by the processing circuit 16, designated by WORD; then, a subprogram 504 to normalize or standardize the form in which the items of information relating to a pronounced word are preserved (NORM). It then comprises a comparison loop for comparing the pronounced word in its coded and standardized form to the memorized words of the vocabulary which of course are coded and standardized in the same fashion.

The comparison loop first comprises a subprogram 506 which initializes the variable k to zero, increments the variable k by one unit after each loop (k=k+1) and finally, compares the value of k to the total number of words in the vocabulary n, to interrupt performance of the cycle when k is of a value n, the program then going to the output subprogram 508 (OUTPUT). The loop also comprises a correlation subprogram 510 (CORR) which measures the distance between the word pronounced and each of the words of the vocabulary. Finally, it includes a subprogram 512 for comparing these different distances and selecting the word in the vocabulary, the distance of which from the pronounced word is the shortest (BEST).

Figure 5:
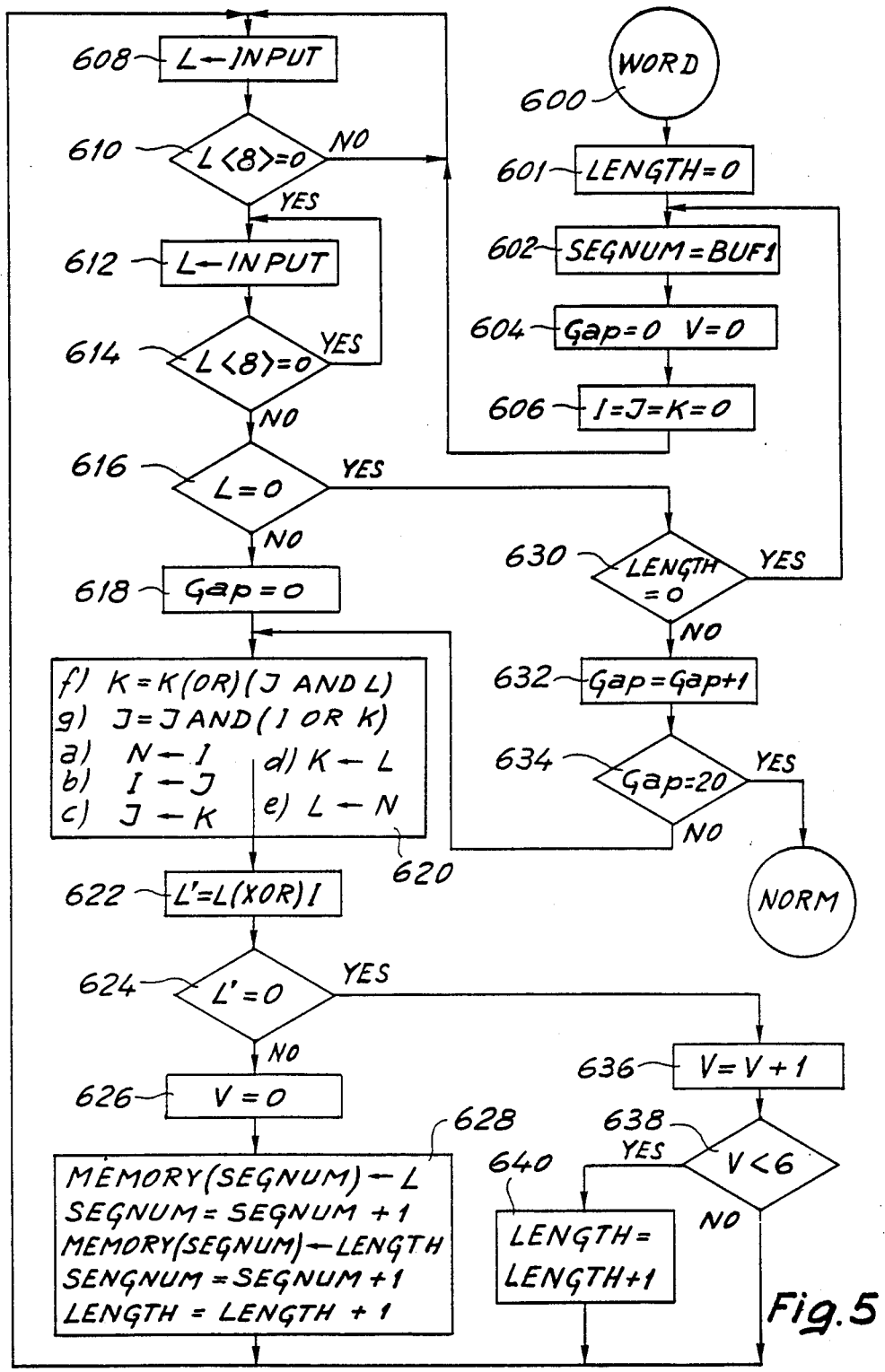
FIG. 5 shows in detail the algorithm of the subprogram WORD shown in FIG. 4.

FIG. 5 shows in detail the algorithm of the subprogram 502 (WORD). Before describing that algorithm, we shall describe by reference to the time diagrams shown in FIGS. 5a and 5b, the processing to which the algorithm subjects the signal T issuing from the coding circuit 16 or more precisely the seven parallel signals $U'_1$ to $U'_7$ forming the signal T. The purpose of this treatment is to simplify those signals without losing information. It should be recalled that the words of the vocabulary of the watch, which are contained in the memory 20, are coded in the same manner as each word pronounced by the user for controlling the watch. Now, it is clear that, the more the signal is simplified, the more the number of items of information required to memorize that signal is reduced. The number of memory positions required is therefore also reduced.

Figure 5A:
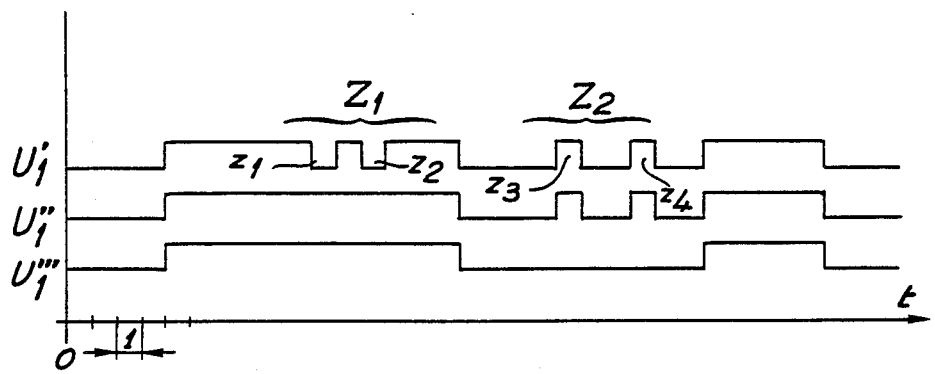
FIGS. 5a and 5b show in the form of time diagrams, phases of processing of the word pronounced, corresponding to certain instructions of the subprogram of FIG. 5.

The first curve in FIG. 5a represents the signal $U'_1$ versus time t at the output of the comparator $34_1$, the unit being the sampling period which is for example 10 ms. It will be seen from this curve that in region $Z_1$, the signal $U'_1$ is of a value one, except for two sampling periods $z_1$ and $z_2$ when it is zero. In fact, those two periods being of the value zero are not significant of the initial sound signal but only indicate that, in the time region $Z_1$, the signal $U'_1$ has fluctuated about the threshold value. It is therefore desirable to "block" those holes, by allocating the value "1" to the corresponding samples. Similarly, in the region $Z_2$, the signal $U'_1$ is zero in value, except for the sampling periods $z_3$ and $z_4$. In order not to lose information, it is found to be desirable firstly to suppress the isolated "0", before suppressing the isolated "1". The curve $U''_1$ gives the signal produced after having eliminated the isolated "0" in the signal $U'_1$ and the curve $U'''_1$ gives the signal produced after having successively eliminated the isolated "0" and then the isolated "1" in the signal $U'_1$. This processing is applied independently to each signal $U'_i$.

Figure 5B:
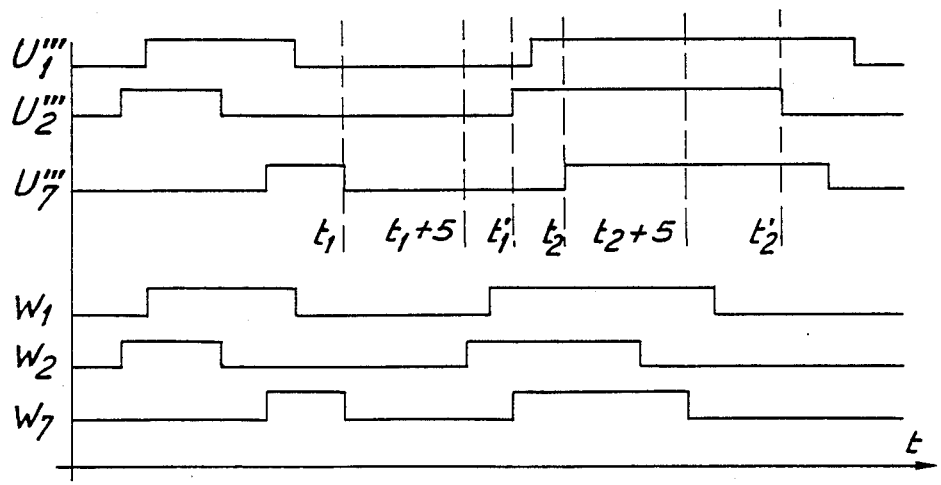

The processing illustrated by FIG. 5b is applied in its entirety to all the seven signals $U'''_1$ to $U'''_7$ which have already been subjected to the processing described in connection with FIG. 5a. It corresponds to the fact that it is the transitions, that is to say, the changes in logic state of the signals, which are characteristic in respect of the sound message contained in the electrical signal. Now, when a vowel is pronounced in a word, the seven signals $U'_1$ to $U'_7$ or more precisely the signals $U'''_1$ to $U'''_7$ may all conserve the same logic value during a high number of successive sampling periods. This situation is therefore actually encountered. Moreover, as already described above, each signal corresponding to a word is "standardized" or "normalized", that is to say, the number of samples which are effectively retained for each signal is limited for example to sixteen. This standardization or normalization step comprises a similarity in respect of construction and position, applied to all the samples of a word. If for example, the signals $U'''_1$ to $U'''_7$ each comprise $n_1$ samples, the similarity ratio $16/n_1$ is applied in each signal. This means that in each signal and for each segment, that is to say, for each group of successive samples of the same logic value, the number of samples of the segment is multiplied by the similarity ratio $16/n_1$. It is clear therefore that, by preserving substantial portions of the signal $U'''_1$ to $U'''_7$ in respect of which there are no transitions, not only is the quality of the signal retained not improved but in addition it runs the risk of being detrimentically affected because, in the similarity in respect of construction and position of the rapid transitions, there is a danger of significant parts of signals disappearing. Now, such transitions contain interesting information.

The processing illustrated by FIG. 5b is as follows. The successive samples in respect of which none of the signals has a transition are detected in the group of signals $U'''_1$ to $U'''_7$. If that number of samples exceeds a value $n_2$ ($n_2$ is of a value 5 in the example shown in FIG. 5b), the samples, as from the $(n_2+1)$th are suppressed until a transition is detected on any one of the signal $U'''_1$ to $U'''_7$.

If reference is made to FIG. 5b, it will be seen that, between the moments $t_1$ and $t'_1$, the signals $U'''_1$ to $U'''_7$ (only the signals $U'''_1$, $U'''_2$ and $U'''_7$ are shown, in oder to simplify the drawing) retain the logic value "0". Likewise, between moments $t_2$ and $t'_2$, the signals retain the logic value "1". In accordance with the processing described hereinbefore, the samples of the signals are preserved between $t_1$ and $t_1+5$ and they are suppressed between the moments $t_1+5$ and $t'_1$. Likewise, between the moments $t_2$ and $t_2+5$, the samples are preserved while they are suppressed between the moments $t_2+5$ and $t'_2$. The signals $W_1$, $W_2$ and $W_7$ represent the signals produced after processing of the signals $U'''_1$, $U'''_2$ and $U'''_7$.

In order to carry out these different processing operations, the subprogram WORD shown in FIG. 5 uses a number of variables which should now be defined. The variable LENGTH is linked to the length of the word; the variable SEGNUM is a memory pointer; the variable GAP is linked to the number of successive samples of logic value 0 after a non-zero sample of that word has been detected. The variable V is linked to the number of successive samples which appear without a transition occurring. The variables L, K, J, I represent positions in the random access memory 18; while L(8) represents the most significant bit of the information contained in the memory 18 at the address L. That binary value is always 1 and serves for synchronization of the program.

After the beginning of the program indicated by reference 600, the instruction 601 initializes to zero the variable LENGTH.

The instruction 602 initializes the memory pointer SEGNUM to the value BUF 1 which is the address of the first position of the random access memory, intended to contain the samples of the word to be coded.

The instruction 604 initializes the variables V and GAP to zero.

The instruction 606 initializes the variables I, J and K to zero.

The instruction 608 causes transfer into the memory position L of the sample of the word present in the input register INPUT. The instructions 610 to 614 serve to synchronize the program. The test 616 compares to zero the sample which is contained in the memory at the address L. If the test is negative, that is to say, if the sample is not zero, the instruction 618 maintains the variable GAP pr resets it at zero. The group of instructions 620 carries out the treatment illustrated in FIG. 5a, that is to say, the elimination of the isolated zeros and ones. For that purpose, the four memory positions L, K, J, I play the part of a four-position shift register. By virtue of the instructions 620a to 620e, each sample "progresses" successively from position L to postion I in steps of one for each clock signal. The instruction 620f causes suppression of the isolated "zeros". It comprises carrying out the logic operation $K=KU(J\cap L)$ in which U represents the function OR and $\cap$ represents the function AND. It will be appreciated that this operation relates simultaneously to the seven binary positions of the samples. It will be readily appreciated that, if the address sample J and/or the address sample L is zero, that is to say, if the sample K is not "surrounded" by samples J and L of value "1", the expression $J\cap L$ is zero and the value of the sample K is not modified. On the other hand, if J and L are both of a value "1", the sample K is forced to a value of "1", that sample will assume the value zero only if the samples I and K are both zero. This in fact corresponds to the suppression of an isolated "one". With the operation 620g being shifted by a memory position with respect to the operation 620f, it is in fact the latter which is performed first.

The instruction 622 serves to detect any transition which may occur between two successive samples L and I. It comprises the logic operation $L'=L(XOR)I$, with the symbol (XOR) representing the function EXCLUSIVE OR.

It will be seen that, if L and I are different, that is to say, if there is a transition in any one of the signals $U'''_1$ to $U'''_7$, L' assumes the value "1". If on the other hand, L and I are identical, L' assumes the value zero. The instruction 624 compares the value of L' to zero. If L' is different from zero, that is to say, if L ans I are different, the instruction 626 sets or resets the variable V to zero. The group of instructions 628 transfers the sample L into the random access memory at the address SEGNUM; it increments by one the variable SEGNUM, it transfers the value of the variable LENGTH into the random access memory at the fresh address SEGNUM, and finally, it increments the variables LENGTH and SEGNUM by one. The subprogram is then returned to the instruction 608 for processing the following sample.

If the instruction 616 has detected that L is equal to "0", that is to say, if the sample L is formed only by zeros, the subprogram goes to the instruction 630 which compares the variable LENGTH to zero. If that variable is zero, the subprogram returns to the instruction 602. In fact, that means that the samples already introduced are all zero. If the variable LENGTH is different from zero, the instruction 634 compares that fresh value of GAP to 20. If the variable is lower than twenty, the subprogram goes to instruction 620.

If the instruction 624 has detected that L' is equal to zero, that is to say, that repetition has occured, the instruction 636 increments the variable V by one unit and the instruction 638 compares that fresh value of V to 6.

If the variable V is lower than 6, the instruction 640 increments the variable LENGTH by one unit and the subprogram returns to the instruction 608. If on the other hand, the variable V is equal to 6, the subprogram returns directly to instruction 608.

It will be clearly seen that the instructions 624, 636, 638 and 640 perfom the processing described in connection with FIG. 5b. In fact, instruction 624 detects that a sample is identical to the previous sample; instruction 636 counts the number of identical consecutive samples; and instruction 638 compares that number to 5. A soon as that number is higher than 5, it will be seen that the variable LENGTH is no longer incremented, which corresponds to suppressing the samples. This suppression effect is maintained as long as the instruction 624 detects that the value of L' is zero, that is to say, as long as there is repetition.

It should also be noted that, in the random access memory 18, one address in two serves to memorize the value of a sample and the following address serves to memorize the value of the variable LENGTH which marks the position of that sample in the word after it has been subjected to the processing operations described in relation to FIGS. 5a and 5b. In addition, it will be clearly seen, that memorization by the instruction 628 occurs only if L' is different from zero. That is to say, a sample is memorized only if it is different from the previously memorized sample.

Following this subprogram, the memory 18 therefore contains at successive addresses, alternatively an item of information giving the value of a sample which is different from the preceding sample, and an item of information LENGTH giving the position of that sample in the signal.

Figure 6:
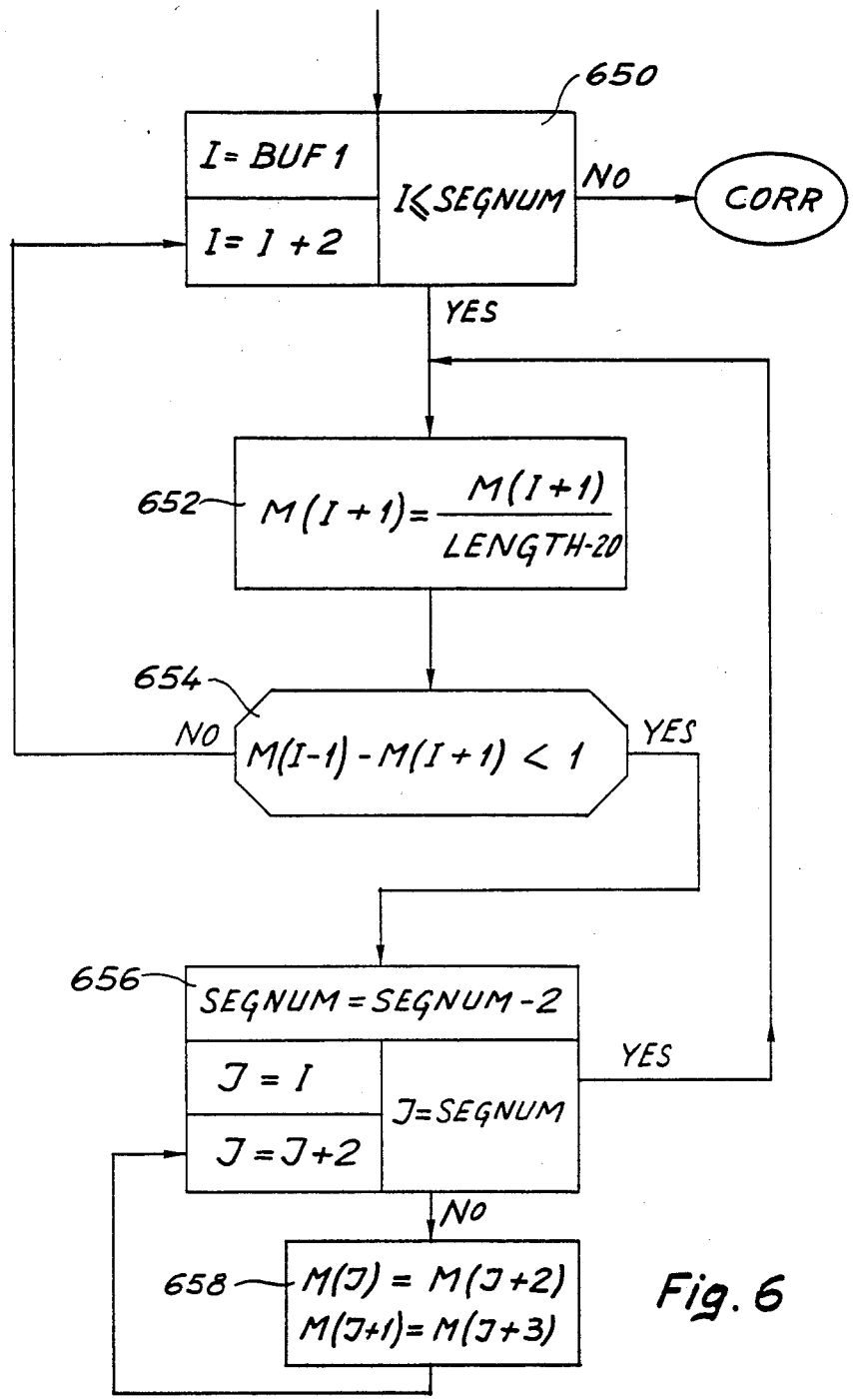
FIG. 6 shows the algorithm of the subprogram NORM shown in FIG. 4.

The purpose of the subprogram NORM illustrated in FIG. 6 is to standardize or normalize the number of samples forming the coding of the word pronounced. In the example under consideration, that number of samples is equal to 16. The total number of samples memorized at the end of the subprogram WORD is equal to the final value of the variable LENGTH, reduced by 20. In fact, the end of a word is detected when the variable GAP is of a value of 20, which corresponds to 20 consecutive zero samples. Therefore, the number representing the position of a sample in the word must be mulitiplied by the ratio 16/(LENGTH-20). It is this that is performed by the subprogram NORM.

The subprogram NORM uses the variables I and J which represent addresses in the random access memory 18. The instruction 650 initializes the variable I to the value BUF 1 which corresponds to the first address of the random access memory containing an item of information about the word; it increments the variable I by two units and compares the variable I to the value SEGNUM which is the last address of the random access memory containing information about the word. The following instruction, indicated at 652, increments the variable I by one unit and extracts from the random access memory the address information I+1 which is denoted M (I+1). That information corresponds to the value of the variable LENGTH for the sample, the value of which is stored at adress I. The instruction 652 then calculates the value of M (I+1). That information corresponds to the value of the variable LENGTH for the sample, the value of which is stored at address I. The instruction 652 then calculates the value of $$M(I+1) \times 16/(LENGTH-20)$$

and re-introduces that calculated value into the memory at the address I+1.

Instruction 654 compares the value of M(I−1)−−M(I+1) to "1". If that difference is in fact more than "1", the subprogram returns to the instruction 650 which increments the variable I by two units. In other words, the variable I assumes a new value which corresponds to the address in the random access memory 18 of the position information associated with the following sample. If the difference is less than one, that means that there is "telescoping" between the address samples I−2 and I by virtue of the normalization operation. In other words, that means that the duration of the corresponding segment before normalization was insufficient for that segment to remain after normalization.

In this case, the items of information relating to the samples of that segment must be suppressed and the following items of information must be shifted by two addresses. This is performed by instructions 656 and 658. Instruction 656 reduces the value of the variable SEGNUM by two since the words contains two items of information less; it replaces the variable I by the variable J; it increases the variable J by two; and it compares the value of J to the new value of the variable SEGNUM. Instruction 658 causes all the items of information to be shifted by two steps. Sub-instruction M (J)=M(J+2) transfers to the address J the information initially contained at the adress J+2. This is an item of sample value information. The sub-instruction M(J+1)=M(J+3) transfers to the address J+1 the item of information initially contained at the address J+3, which is an item of information in regard to position of the sample in the word. When instruction 656 detects that J=SEGNUM, that is to say, all the items of information have been advanced by two steps, the subprogram returns to instruction 652 since the loop formed by instructions 656 and 658 has already incremented the variable I by two units.

When, after a certain number of cycles, instruction 650 detects that the variable I is higher than SEGNUM, the program goes to the subprogram CORR which measures the distance between the word pronounced by the user and which has been coded and standardized by the subprograms WORD and NORM, with the different words of the vocabulary of the watch, which are initially stored in the read only memory and which have been transferred into the random access memory by the subprogram INIT. It will be appreciated that those words, which are referred to hereinafter as references, have been coded and standardized using the same algorithms as the words pronounced by the user.

After a word pronounced by the user of the watch has been coded and standardized, the information which memorizes it can be represented in the form of a matrix having I lines and J columns. In the particular example in question, I is 7 and J is 16. Each column contains the seven binary items of information about a sample, and a line contains binary information resulting from coding and standardization of the signal supplied by the filtering channel.

Figure 6A:
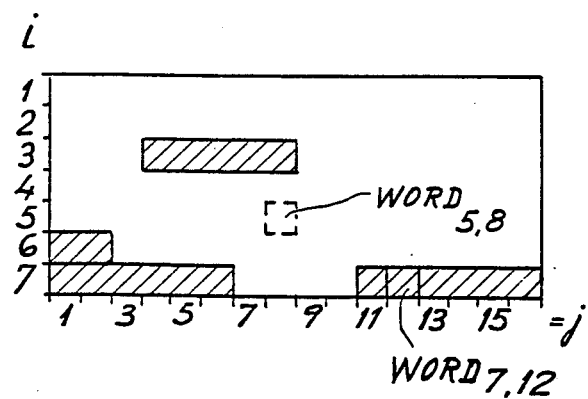
FIGS. 6a–6c are illustrations of the running of subprogram CORR in FIG. 4.

A word is defined in the following manner:

$$\text{Word} = \{\text{Word}_{i,j}; i=1, 2, \ldots I; j=1, 2, \ldots J\} \text{ with } \text{Word}_{i,j} \in \{0,1\}$$

in which for example, in the case shown in FIG. 6a, the information $\text{WORD}_{3,13}$ is zero and $\text{WORD}_{7,15}$ is one. In the same manner, the reference memory 20 may be defined as an assembly of coded items of information in respect of reference words, defined by:

$$\text{Ref} = \{\text{Ref}^k, k=1, 2, \ldots n\}$$

wherein n is the number of references initially contained in the memory, that is to say, the number of words in the vocabulary.

Each word of the memory is designated by $\text{Ref}^k$ with:

$$\text{Ref}^k = \{\text{Ref}_{i,j}^k; i=1, 2, \ldots I; j=1, 2, \ldots J\}$$

The distance between a coded word "WORD" and a reference in the memory $Ref^k$ is given by the following:

$$\delta(Word, Ref^k) = \frac{\sum_{i=1}^{i=I}\sum_{j=1}^{j=J}(Word_{i,j} \oplus Ref_{i,j}^k)}{\sum_{i=1}^{i=I}\sum_{j=1}^{j=J}(Word_{i,j} + Ref_{i,j}^k)} \quad (1)$$

in which the sign $\oplus$ represents the logic function EXCLUSIVE OR, I represents the number of channels and J represents the number of samples.

Figure 6B:
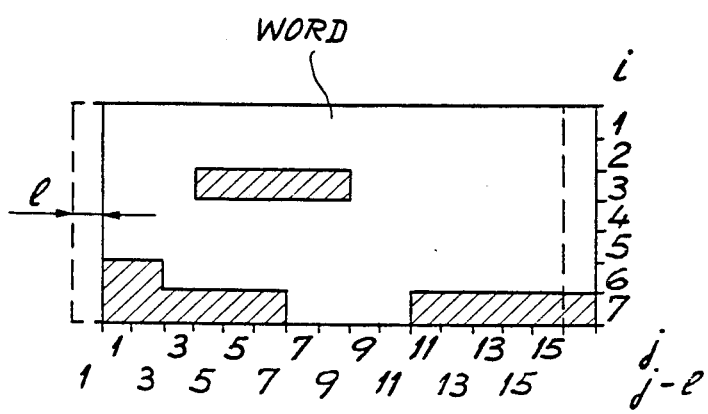
Figure 6C:
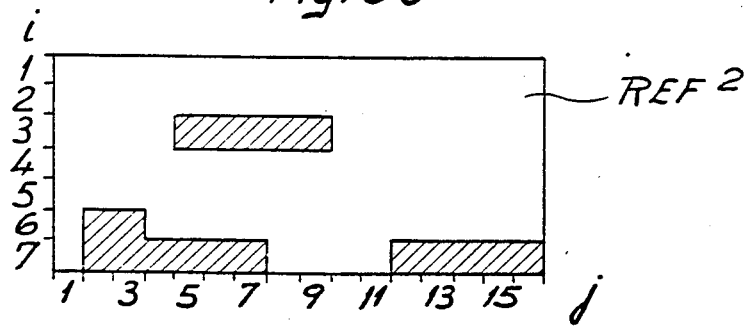

It is clear that this distance may be specifically defined in the following manner. The basic starting point is the table similar to that shown in FIG. 6a, corresponding respectively to the word "Word" and to the reference $Ref^k$, and those two tables are superposed. The numerator of the right-hand term of the equation (1) is equal to the number of points in the two tables which are allocated the binary value 1, which are not superposed, while the denominator is equal to the sum of the points in the two tables of binary value 1. FIGS. 6b and 6c respectively show a table corresponding to a word and a table corresponding to a reference $Ref^2$. It will be seen immediately that, by superposing those two tables as they are, the points which are allocated the binary value 1 which are not superposed, are numerous. In other words, the distance between those two words is substantial. However, it will be seen that by shifting the contour of the table of the word (FIG. 6b) one step towards the left, without altering the position of the points allocated the binary value of 1, the resemblance between the two tables when altered in that fashion is very substantial. It will be readily appreciated that in fact the word and the reference correspond to the same pronounced word and that the apparent difference results solely from a general displacement in detection and coding of the word. In order for measurement of the distance between two words to be truly effective, it is therefore desirable also to envisage possibilities of displacement between the words to be compared or between the word and the reference to be compared. It is this that will be described hereinafter, using l to indicate the shift of displacement which, in the situation shown in FIG. 6b, would be $-1$.

When the displacement l is introduced, the distance $\delta l$ between the word "Word" and the reference $Ref^k$ is defined in the following manner:

$$\delta_l(Word, Ref^k) = \frac{\sum_{j=1-|l|}^{j=I+|l|}\sum_{i=1}^{i=I}(Word_{i,j-l} \oplus Ref_{i,j}^k)}{\sum_{j=1}^{j=I}\sum_{i=1}^{i=J}(Word_{i,j} + Ref_{i,j}^k)}$$

with $Word_{i,j-l} = 0$ for $j - l$ & $1, 2 \ldots J$ and $Ref_{i,j} = 0$ for $j$ & $1, 2 \ldots J$ In order to compare a word and a reference, or two words together, the distances $\delta$ are calculated for shifts from $l = +L_1$ to $l = -l_1$, in steps of one. For example, $l_1 = 2$.

The distance $\delta_k$ between the pronounced word WORD and the reference $Ref^k$ is defined by the following relationship:

$$\delta_k = INF(\delta_l, l = -l_1 \ldots +l_1)$$

$BEST_k$ will be used to denote the smallest distance between the word pronounced by the user of the watch and the word in the vocabulary which is denoted by $Ref^k$.

The subprogram BEST selects from the values $BEST^k$, for k ranging from 1 to n (n: number of Ref in the vocabulary), that which is the lowest. It is then the word $Ref^k$ which is selected.

Figure 7:
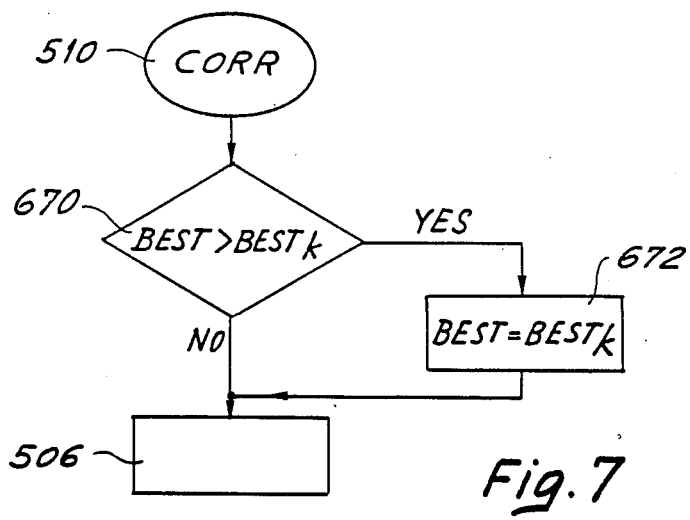
FIG. 7 shows the algorithm of the subprogram BEST in FIG. 4.

The subprogram BEST in FIG. 7 comprises instruction 670 which compares $BEST_k$ which has just been calculated with BEST which represents the smallest distance defined previously. If BEST is less than $BEST_k$, the program returns to instruction 506 in FIG. 4 to calculate a fresh value of $BEST_k$. If $BEST_k$ is less than BEST, instruction 672 substitutes for the previous BEST the fresh value $BEST_k$. When instruction 506 detects that all the references of the vocabulary have been compared to the pronounced word (k=n), the program goes to the output subprogram OUTPUT, indicated at 508. That subprogram supplies the control signal N of the circuit 28. That signal is broken down into a signal WORD which in binary form contains coding of the reference which has been selected and a signal READY which is simply a pulse to indicate that a word has actually been heard and selected by watch circuit B.

As described hereinbefore, the circuit D for producing logic information supplies for each word pronounced, on the one hand, a signal WORD which is characteristic in respect of the word pronounced, and on the other hand a signal READY indicating that a word is actually present.

Figure 8:
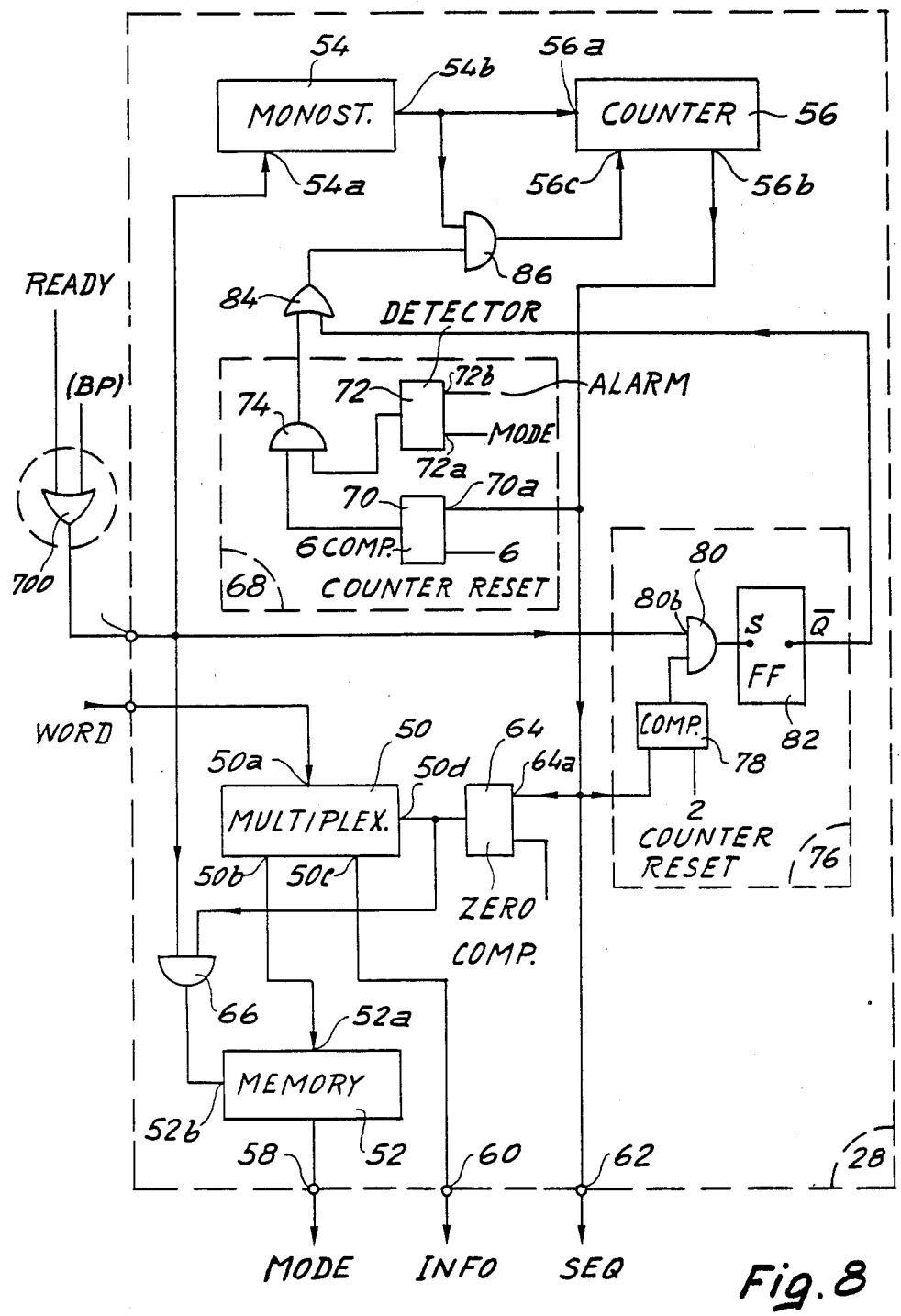
FIG. 8 is a schematic diagram of a first embodiment of the logic control circuit of the watch.

FIG. 8 shows the logic control circuit or decoder 28 in detail.

Before this circuit is described in detail, it may be appropriate to explain the manner in which the logic information essentially formed by the signal WORD is processed to produce the control signals. In the first example under consideration, the watch comprises three functions, a function WATCH for displaying the time, showing hours, minutes and seconds; a function ALARM which involves hours and minutes; and a function commonly referred to as TIMER, which involves hours, minutes and seconds.

In addition, for each function or mode of operation, it is necessary to be able to control commencement START or termination STOP. Finally, the statement of a complete item of information necessitates the use of six figures (jours, minutes, seconds), from zero to nine. The vocabulary necessary to control the watch therefore comprises fifteen words. There are therefore fifteen different signals WORD.

It is clear moreover that complete control of a function requires a plurality of instructions which must be introduced into the watch by the user in a precise order. The first instruction concerns the function to be performed. This is an instruction MODE. Then, the user must indicate if the fonction is to be set in operation or stopped (START or STOP). Finally, the user must successively state the figures corresponding to the time information. Those figures successively correspond to tens of hours (DH), hours (H), tens of minutes (DM) and minutes (M) for the function ALARM and in addition to tens of seconds (DS) and seconds (S) for the functions WATCH and TIMER. Complete control of a function therefore requires the introduction of six or eight successive instructions which are classified on a chronological basis. In order to take account of all those items of information, the circuit 28 supplies three control signals: a signal MODE which can assume three different binary digital values respectively corresponding to the functions WATCH, ALARM and TIMER; a signal INFO which can assume twelve different binary values to represent either the information START or STOP, or one of the ten figures; and a signal SEQ which in binary form gives the position of the instruction given by the signal MODE or INFO in the succession of instructions corresponding to the performance of a function. The signal SEQ assumes the value zero when the signal MODE is produced. It assumes for example the values of one to five or one to seven to mark the introduction of the instruction START or STOP (value 1) and the introduction of the signals INFO corresponding to DH, H, DM, M (values 2 to 5) or DH, H, DM, M, DS, S (values 2 to 7). At each moment that the watch is in the course of being controlled, the circuit 28 supplies a signal MODE giving the function being performed, a signal INFO and a signal SEQ, the combination of which provides the item of data which is to be introduced, including starting or stopping the function in question.

To produce the signals MODE, INFO and SEQ, the circuit 28 comprises a multiplexer 50, the input 50a of which receives the signal WORD. The multiplexer comprises two outputs 50b and 50c which respectively supply the signals MODE and INFO, and a control input 50d. Depending on the binary logic level applied to said input 50d, the signal supplied by the multiplexer 50 appears at the output 50b or the output 50c. The output 50b of the multiplexer is connected to the input 52a of a memory register 52 having a loading input 52b.

The signal READY is applied to the control input 54a of a monostable circuit 54 which at its output 54b supplies a pulse with a delay r relative to the moment at which the control signal is applied. That delay r is for example 5 seconds. The output 54b of the monostable circuit is connected to the clock input 56a of a counter 56 which counts in $N_1$. $N_1$ is an integer equal to the maximum total number of instructions required to control a function of the watch. In the first example under consideration, $N_1$ is of a value 8.

Initially, the counter is at zero. Each time that a period r (5 seconds) elapses between a pulse of the signal READY and the following pulse of the same signal, the latter pulse causes incrementation of the counter 56 by one unit, by way of the monostable circuit 54. When the content of the counter reaches 7, the following pulse resets the counter to zero. As the application of a pulse of the signal READY to the monostable circuit 54 corresponds to the application of a signal WORD to the multiplexer 50, it will be clearly apparent that the successive contents of the counter 56 correspond to the position of the instructions in respect of the same function, which are successively introduced into the watch.

The output 56b of the counter 56 therefore produces the signal SEQ. The signals MODE, INFO and SEQ are respectively produced at the outputs 58, 60 and 62 of the circuit 28.

The circuit 28 also comprises a zero comparator 64, the input 64a of which is connected to the output of the counter 56. The circuit 64 produces a signal at logic level "1" when the signal SEQ applied to its input 64a is zero. That logic level "1" controls activation of the output 50b. In contrast, when the input 50d is at the level "0", it is the output 50c which is activated. The output of the comparator 64 is also applied to an input of an AND gate 66 which receives the signal READY at its second input. The output of the AND gate 66 is connected to the loading input 52b of the memory 52. The circuit 28 further comprises the circuit 68 which permits the counter 56 to be reset to zero when the function performed is ALARM and the four corresponding items of digital information have been introduced. For that purpose, the circuit 68 comprises a six comparator 70, the input 70a of which is connected to the output 56b of the counter.

It should be recalled that the signal SEQ assumes the value 6 after display of the fourth item of digital information and that that item of information is the last to be supplied in the case of the function ALARM. The circuit 68 also comprises a detector 72 for detecting the mode ALARM. The detector 72 receives at its input 72a the signal MODE supplied by the memory 52 and at its input 72b a digital value corresponding to the value of the signal MODE for the function ALARM (for example 1). The outputs of comparator 70 and detector 72 are connected to the two inputs of an AND gate 74. When the signals appearing at the outputs of comparator 70 and detector 72 are both at logic level "1", the gate 74 supplies a logic signal at level "1", to reset the count 56 to zero.

The purpose of a circuit 76 is to reset the counter 56 to zero when the function controlled requires only two instructions, namely a MODE instruction and a START or STOP instruction. This is the case for example, if the user simply wants to start his watch going again, after having stopped it. The instructions are then WATCH and START. For that purpose, the circuit 76 comprises a two comparator 78, the input 78a of which is connected to the output of the counter 56. It should be recalled that the signal SEQ assumes the digital value 2 for introducing the first item of digital data.

The output of the detector 78 is applied to an input of an AND gate 80, the other input 80b of which receives the pulses of the signal READY. The output of the gate 80 is connected to the S input of a RS-type flip-flop 82. The $\bar{Q}$ output of the flip-flop 82 supplies a signal which resets the counter 56 to zero when that signal is at logic level "1". The outputs of the flip-flop 82 and the gate 74 of the circuit 68 are connected to the inputs of an OR gate 84. The output of the gate 84 is connected to an input of an AND gate 86, the second input of the gate 86 receiving the signal supplied by the monostable circuit 54. The output of the gate 86 is connected to the zero resetting input 56c of the counter 56. For example, the circuits 63, 70, 72 and 78 are formed by comparators which compare one by one the binary positions of the two signals and which produce an identity signal if all the binary positions of the two signals are identical.

The mode of operation of the circuit 28 is as follows:

When the user pronounces the first word which corresponds to one of the three functions, there appear at the inputs of multiplexer 50 and memory 52 a signal WORD and a pulse of the signal READY. Taking account of the time constant of the monostable circuit 54, the counter 56 remains at zero and the value of the signal SEQ is zero.

The information contained in the signal WORD is introduced into the multiplexer 50. At the same time, the comparator 64 produces a signal at logic level "1" for causing activation of the output 50b of the muliplexer. The information contained in the signal WORD is therefore interpreted as a signal MODE, the particular value of which defines the function to be carried out.

In addition, the signal at logic level "1" which is produced by the gate 66 causes loading of the information MODE into the memory 52. If the user has made a mistake in regard to the function, he has five seconds to state a new function. In fact, for a period of five seconds, the counter 56 remains at zero and any fresh word pronounced during that period is therefore considered as an item of MODE information which replaces the first item. It will be appreciated that, if the user corrects the name of the function, the fresh pulse of the signal READY re-initializes the period of five seconds. After five seconds, the user can introduce the second instruction. The counter 56 then being at 1, the value of the signal SEQ is 1 and that instruction is interpreted as an instruction START or STOP. The comparator 64 causes activation of the output 50c of the multiplexer and at the output 60 the signal INFO assumes the value corresponding to the instruction START or STOP. Five seconds later, the counter 56 is incremented to 2 (the value of the signal SEQ is 2). The user can then introduce the third instruction, after elapse of five seconds. If he does not do that, that is to say, if the function comprises only two instructions, the circuit 76 detects that situation and resets the counter 56 to zero.

If in contrast the user pronounces a word during that period of five seconds, the counter is not reset to zero and the signal INFO assumes the value corresponding to the word pronounced. In the case in question, this is a figure which represents tens of hours. The fact that tens of hours are involved is indicated by the value of 2 of the signal SEQ. The user then introduces the other items of information, whereby the counter 56 is incremented each time by one unit, and the digital value of the signal SEQ is similarly incremented. If the function being controlled is the function ALARM, the circuit 68 resets the counter 56 to zero after four items of digital information have been introduced. If another function is involved, the counter is automatically reset to zero after the introduction of six items of digital information (DH, H, DM, M, DS and S). Obviously, after each of those data has been introduced, the user has a period of five seconds (more generally a period r) to correct the item of data, and after that correction operation, he has another period of five seconds to correct the item of data again. It will thus be clearly evident that the circuit 28 defines an automatic sequence which is independent of the user, and which fixes the position of the item of information introduced by the user, and therefore the nature thereof. As will be described hereinafter, this automatic sequence also serves to inform the user about the nature of the instruction that he must give the watch.

Figure 9A:
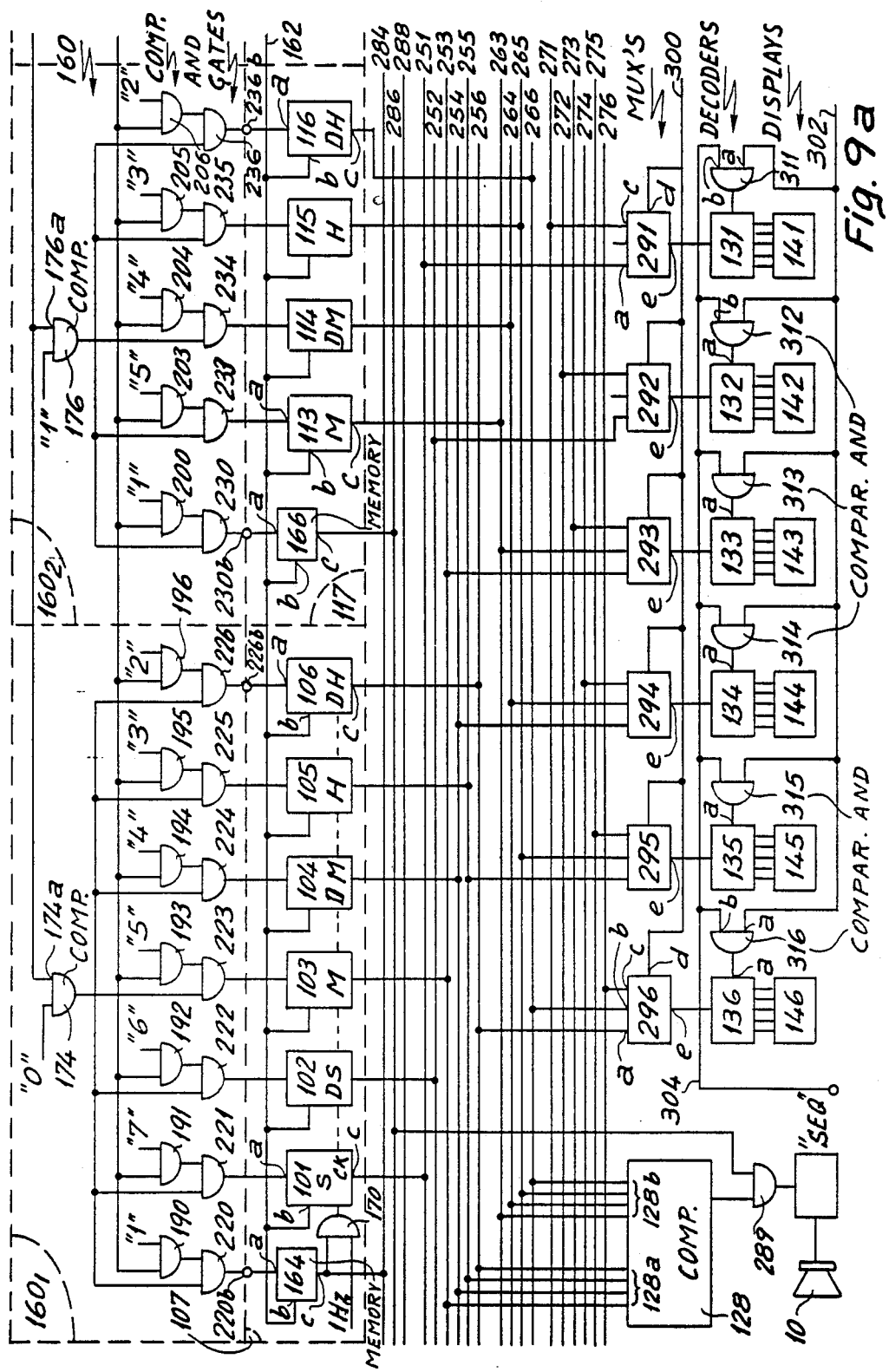

FIGS. 9a and 9b show in more detailed form the part B of the watch and more particularly the display control circuit 6. This circuit conventionally comprises divider stages 101 to 106 which, taking a signal at a frequency of 1 Hz, respectively supply signals in respect of seconds (S), tens of seconds (DS), minutes (m), tens of minutes (DM), hours (H) and tens of hours (DH). The dividers serve to produce the display of time information. They are generally indicated by reference numeral 107. They correspond therefore to the function of mode WATCH. It also comprises the divider stages 113 to 116 corresponding to the provision of an alarm or awakening time ALARM function. They respectively supply the items of information M, DM, H and DH and are generally indicated by reference numeral 117. Finally, the circuit includes the dividers 121 to 126 which are arranged as down counters which respectively supply the signals S, DS, M, DM, H and DH. These dividers serve to produce the function TIMER and are denoted by the general reference numeral 127. The circuit also conventionally includes a comparator 128 which compares the state of the time counters 103 to 106, to the state of the alarm counters 113 to 116. When the comparator 128 has detected a condition of identity between those two groups of counters, it activates the sound generator 10. The circuit also comprises in known manner decoders 131 to 136 which control digital display elements 141 to 146 which respectively correspond to the items of information S, DS, M, DM, H and DH and which are generally denoted by reference numeral 8 in FIG. 1. Finally, the function display means comprise symbols 151, 152 ans 153 which respectively show the function WATCH, ALARM and TIMER. They are generally indicated by reference numeral 11 in FIG. 1.

The circuit 28 also comprises particular components which are involved in controlling the watch by means of speech. Those components include the address assembly 160 which receives the signal MODE at a first input 160a and the signal SEQ at a second input 160b.

The address assembly 160 serves to control loading of the counter which is to receive the information in the signal INFO. The signal INFO is simultaneously applied to all the dividers 101 to 106, 113 to 116 and 121 to 126 by a bus 162. In each of those dividers, the loading input has been indicated by reference b in order to simplify the drawing. In addition to the dividers, there are three memories indicated at 164, 166 and 168, associated with the modes WATCH, ALARM and TIMER. Those memories store the information START or STOP for each function. It will be appreciated that the bus 162 also applies the signal INFO to the inputs of the memories 164, 166 and 168, those inputs also being denoted by b. In fact, the signal INFO also contains the information START or STOP. The purpose of the memories 164 and 168 is also to cause or interrupt the application of the 1 Hz signal issuing from the divider 4 (FIG. 1), to the clock input CK of the groups of counters 107 and 127 respectively for the time function and the timer function. For that purpose, the output indicated by c of the memories 164 and 168 is connected to an input of an AND gate 170 and 172 respectively. The other input of each of those gates receives the 1 Hz signal.

For the purpose of describing the addressing circuit 160, it will be assumed that the signal MODE assumes the digital values 0, 1 and 2 respectively for the WATCH, ALARM and TIMER functions. Likewise, it is assumed that the signal SEQ assumes the digital values of 0 to 7 respectively for the signal MODE, for the information STOP or START and for the items of information DH, H, DM, M, DS, S, thereby giving the table shown in FIG. 10.

The input 160a is connected to the first inputs 174a, 176a and 178a of comparators 174, 176 and 178 which respectively compare the signal applied to their first input to the digital values 0, 1 and 2. Consequently, a signal at logic level "1" appears at the output of the comparator 178 if the function TIMER is actuated, at the output of the comparator 176, if the function ALARM is actuated and at the output of the comparator 174, if the function WATCH is actuated. The input 160b of the assembly 160 is connected to a first input of comparators which are distributed in three groups and denoted at 190 to 196, 200 and 203 to 206, and 210 to 216, each group corresponding to a function. The addressing circuit can thus be divided into three assemblies indicated at $160_1$, $160_2$ and $160_3$ respectively corresponding to the functions WATCH, ALARM and TIMER. These assemblies are of a similar structure. The comparators 190 to 196 respectively compare the signal SEQ to the digital values 1, 7, 6, 5, 4, 3 and 2, the significance of which is given by the table shown in FIG. 10. Likewise, the comparators 200 and 203 to 206 compare the signal SEQ to values 1, 5, 4, 3 and 2. Finally, comparators 210 to 216 compare the signal SEQ to the values 1, 7, 6, 5, 4, 3 and 2. Consequently, if a logic signal at level "1" appears at the output of the comparators 190, 200 and 210, it is that the signal INFO conntains the information START or STOP; if a logic signal at level "1" appears at the output of the comparators 193, 203 and 213, it is because the signal INFO contains information in respect of minutes (M), etc.

Associated with the first group of comparators $160_1$ are seven two-input AND-gates indicated at 220 to 226. Each AND-gate receives at one of its inputs the output of the comparator 190 to 196 having a reference comprising the same number of units as itself, and the output of the comparator 174 at its other input. AND-gates 230 and 233 to 236 associated with the second group $160_2$ of comparators and AND-gates 240 to 246 associated with the third group $160_3$ of comparators are arranged in the same manner. The outputs 220b to 226b, 230b, 233b to 236b and 240b to 246b of the AND-gates at the same time form the outputs of the addressing assembly 160. It will be clear that the linear cascade-type structure of the circuit 160 is the equivalent of a matrix structure having three columns and seven rows. There is no need to explain in detail that at each moment only one of the AND-gates has its output a logic level "1". It is the gate which corresponds to the present value of the signal MODE and the signal SEQ. For example, the gate 234 produces the logic signal "1", if the user causes display of tens of minutes for the function ALARM; each output 220b to 246b is connected to a loading control input a of the corresponding counter 101 to 126, or the corresponding memory 164 to 168. It will thus be clearly seen that at each moment the information contained in the signal INFO is applied to all the loading inputs b of the counters 101 to 126 and the memories 164 to 168, and that that information is passed into the appropriate memory or counter by applying to its loading control input a a signal at logic level "1" which is supplied by one of the outputs 220b to 246b of the addressing circuit 160, that output being defined by the digital value of the signal MODE and SEQ which are present at the same moment.

The state outputs 101c to 106c of the counters 101 to 106 are connected to the lines 251 to 256. Similarly, outputs 113c to 116c of counters 113 to 116 are connected to the lines 263 to 266 and outputs 121c to 126c of counters 121 to 126 are connected to the lines 271 to 276. Finally, the outputs 164c to 168c of the memories 164 to 168 are connected to the lines 284 to 286. It will be apparent that the first group of four inputs 128a of the alarm triggering comparator 128 is connected to the lines 253 to 256 while the second group of four inputs 128b of the comparator 128 is connected to the lines 263 to 266. As is well known, the comparator 128 produces a logic signal when the values applied to its two groups of inputs are identical. That signal is applied to one of the inputs of an AND-gate 289. The other input of the gate 289 is connected to the line 286. In this way, the signal is applied to the sound generator 10 only, if the memory 166 contains the information START, that is to say, the user has caused operation of the awakening or alarm mode.

The decoders 131 to 136 are respectively supplied by multiplexers 291 to 296. Each multiplexer comprises three inputs indicated respectively at a, b and c. The inputs a are connected to a line of the first group of lines 251 to 256, the inputs b are connected to a line of the second group of lines 263 to 266 and the inputs c are connected to a line of the third group of lines 271 to 276. Obviously, the multiplexers 292 and 291 which control display of tens of seconds and seconds have their input b at zero since the function ALARM does not involve seconds. More precisely, an input a, b or c of a multiplexer is connected to the line of the group of lines which corresponds to the same unit of time as the multiplexer. For example, input a of the multiplexer 293 which serves for displaying minutes is connected to the line 253, its input b is connected to the line 263 and its input c is connected to the line 273. Each multiplexer receives at those inputs three items of information corresponding to the three functions of the watch. It is necessary to select that one of the three items of information which is to be passed to the associated decoder. For that purpose, each multiplexer comprises a control input d which by way of the line 300 receives the signal MODE. The value of that signal determines which one of the three items of information will appear at the output e of the multiplexer.

In order to inform the user of the watch about the information that he can control by means of speech, provision is made to cause flashing of either the whole of display elements 141 to 146, or just one of those elements, or none. For that purpose, each decoder comprises a control input indicated by reference a. Either that input receives no signal and the display is permanent, or it receives a signal at a frequency of 2 Hz, which is applied by way of the line 302.

For each decoder, application of the 2 Hz signal to the input a is controlled by a logic circuit. There are therefore six logic circuits 311 to 316. Each logic circuit comprises a digital comparator portion and a gate portion which is controlled by the comparison signal. An input a of each logic circuit receives the 2 Hz signal. The other input b of each logic circuit receives the signal SEQ which is applied by way of the line 304. The comparator portion of each logic circuit compares the digital value of the signal SEQ to the value 1 and to a digital value which corresponds to the digital value of the signal SEQ for displaying the time unit which is to be controlled by the decoder in question. The table sets out those digital values. For example, circuit 313 which is associated with the minutes decoder 133 compares the signal SEQ to the values 1 and 5, the value 5 corresponding to minutes.

If the signal SEQ is of a value equal to 1 or to the comparison value, the gate portion is opened and the 2 Hz signal is applied to the decoder, which causes flashing of the display element controlled by the decoder. In the opposite case, the gate portion is closed. In that case, no signal is applied to the input a of the decoder. To sum up, when the user can enter the instruction START or STOP, the signal SEQ is of a value 1 and all the display elements 141 to 146 flash. Then, it is the display element that the user can actuate which will flash.

Finally, it is necessary to be able to cause excitation of the function display elements 151, 152 and 153. This control action is provided by the logic circuit 320 which comprises three OR-gates 321, 322 and 323. Each of those gates receives at one of its inputs a 2 Hz signal supplied by way of the line 324.

The other input a of each of the OR-gates, which is inverting, is connected to one of the lines 284, 286, 288. Consequently, each input a receives the state of that one of the memories 164 to 168 which is associated with the function controlled by the OR-gate in question. The circuit 320 also comprises three logic circuits 321', 322' and 323'. Each logic circuit receives at a first input a the signal supplied by the associated OR-gate and at a second input b the signal MODE supplied by way of the line 300.

These logic circuits are of the same nature as the circuits 311 to 316. They comprise a digital comparator portion in which the signal MODE applied to the input b is compared to one of the three values that the signal MODE may assume, and a gate portion in which the signal applied to the input a can pass only if the comparison is positive. In other words, if the user successively produces the modes ALARM and STOP, the memory 166 is at state 0.

The input a of the OR-gate 321 being inverting, that gate receives a signal at logic level "1" which therefore "masks" the 2 Hz signal. The logic circuit 322' compares the signal MODE to the value 2. As the user has controlled the function ALARM, the signal MODE is of a value 2. The circuit 322' therefore produces at its output the continuous signal applied to its input a. The display element 152 is therefore continuously excited. If on the other hand, the user had successively instructed ALARM and START, the OR-gate 322 would have supplied the 2 Hz signal at the display element 152 which would have flashed.

The mode of operation of the watch will now be described with reference to the sequence of instructions illustrated in FIG. 11.

In FIG. 11, the first column gives the number of the phase in operation; the second column gives the words pronounced by the user; and the third column sets out what appears at the display means of the watch. FIG. 11 does not show the information in respect of seconds and tens of seconds, in order to facilitate understanding of the arrangement. In fact, such information varies while the watch is being controlled, by virtue of the simple fact of the passage of time if the function WATCH is initiated. The example under consideration relates to a change in time zone.

At he beginning of this sequence, it is assumed that the function WATCH of the watch is functioning, that is to say, that the memory 164 is loaded to a value of 1. In consequence, and besides any command, the dividers 101 to 106 are incremented by the 1 Hz signal. The user puts the watch into the listening condition by actuating the switch 40.

The counter 56 is at zero and the signal SEQ is of a value zero and this corresponds to the introduction of a "MODE". The user pronounces the word "WATCH" (phase 1). Circuit D (FIG. 1) analyses the pronounced word, compares it to the stored references and generates a signal "WORD", the value of which corresponds to the selected reference, and a pulse "READY".

As the signal SEQ is of a value zero, the WORD is interpreted as on signal MODE, the value of which is memorised in the memory 52. As the signal SEQ is of a value zero, all the outputs of the addressing circuit 160 are at level "0". Only the 1 Hz signal increments the counters 101 to 106 since the gate 170 is open. The signal MODE is applied to the control circuit 320.

The logic portion of the circuit 320 which performs the comparison with a value equal to the effective value of the signal MODE is then open and the corresponding display element 151 to 153 is energized. The user can thus check if the reference retained by the circuit D coincides with the word that he actually pronounced. If it is the display element 151 which is energized, the user sees that the watch has properly understood the word WATCH. If that is the case and if, as stated above, the watch is in an operating position (START), the display element flashes. If the watch had been in the position (STOP), the display element 151 would not have flashed. If the energized element is the display element 152 (ALARM function), the user sees that an error has occurred and he has five seconds to repeat the word WATCH, it is assumed that it is actually the element 151 which is flashing. Five seconds after the word WATCH has been pronounced, the monostable circuit 54 produces a pulse which increments the counter 56 to 1. The signal SEQ is of a value 1. The logic circuits 311 to 316 detect that the signal SEQ is of a value 1 and the 2 Hz signal is therefore applied to all the decoders 131 to 136. The six display elements 141 to 146 flash. This is what is shown in FIG. 11, in phase 2. The user knows that he can introduce the instruction START or STOP. In the example under consideration, the user says STOP. The signal WORD which contains that information is applied to the input of the multiplexer 50. As the signal SEQ is of a value 1, it is the output 50c of the multiplexer which is excited.

This therefore produces a signal INFO. As the signal MODE which is stored in memory 52 is still of a value 0 and as the signal SEQ is of a value 1, a signal at logic level "1" appears at the output of the gate 220 of the address circuit 160. The memory 164 is "opened" and the value of the signal INFO is introduced into the memory. That closes the AND gate 170 and the dividers 101 to 106 are no longer incremented. The watch is stopped. In addition, the input a of the logic circuit 321' receives a continuous signal. Therefore, the display element 151 no longer flashes. On the other hand, the elements 141 to 146 continue to flash (phase 3).

If the user wants to set the watch going again, he only has to say START within the five seconds following the word STOP. That possibility is indicated to him by all the display elements 141 to 146 flashing. Phase 4 illustrates starting the watch going again.

If the user had said nothing during that period of five seconds, the monostable circuit 54 would have produced a fresh pulse and the signal SEQ would have been of a value 2. That value is detected by the circuit 78. If in addition the user does not pronounce any word during a period of five seconds (no pulse READY), the output of the circuit 76 produces a logic signal which resets the counter 56 to zero and the watch returns to the initial state.

It is assumed that the user has actually said START, that is to say, the watch has been set going. Five seconds after the user said START, the monostable circuit produces a fresh pulse and the signal SEQ is of a value 2. As the signal MODE is still zero in value and as the value of the signal SEQ is 2, it is the gate 226 of the address circuit 160₁ which produces a signal to open the counter 106 (tens of hours). In addition, the display element 151 continues to flash. The logic circuit 311 detects that the value of the signal SEQ is 2. The 2 Hz signal is therefore applied to the decoder 131 and the display element 141 continues to flash. On the other hand, the other logic circuits 312 to 316 are not open (since the signal SEQ is neither 1 nor at the value to which those circuits are programmed). The display elements 142 to 146 therefore stop flashing (phase 5 in FIG. 11). The user then knows that he can change the figure in respect of the tens of hours, which is flashing.

The user says ONE. The circuit D supplies a signal WORD corresponding to the reference retained, and a pulse READY. The signal WORD gives at the output 50c of the multiplexer 50, a signal INFO corresponding to that reference. As already described above, only the divider 106 is open. The value contained in the signal INFO is therefore loaded into the divider 106. The fresh content of the divider 106 is applied to the multiplexer 296 which selects the input a corresponding to the function WATCH. That new content is displayed by the display element 146 which continues flashing. If the display element actually displays ONE, the user knows that the watch has understood his instruction (phase 6).

Five seconds after the word ONE has been pronounced, the monostable circuit 54 produces a fresh pulse. The value of the signal SEQ is then 3. In consequence, it is the gate 225 of the circuit 160 which produces a signal at logic level "1", the effect of that being to open the divider 105.

At the same time, the signal SEQ is applied to the logic circuits 311 to 316. As the value of the signal SEQ is 3, it is the circuit 315 which is in a transmitting condition and only the display element 145 flashes (phase 7). The user knows that he can introduce a fresh instruction to alter the figure in respect of the hours. It is assumed that the user wants to replace the figure 8 by the figure 6. He therefore pronounces the word SIX. The circuit D produces a signal WORD corresponding to the reference that is considered as being closest to the word pronounced, namely SIX, and a pulse READY. The information contained in the signal WORD is converted into a signal INFO, the value of which is introduced into the divider 105 by the same process as that described for altering the tens of hours. The display element 145 displays the figure corresponding to the new content of the divider 105. The user sees that is is a 7 which appears instead of a 6 (phase 8). An error has therefore occurred. The user has a period of five seconds for correcting that figure, by repeating the word SIX. This possible correction is indicated to the user by the hours figure flashing. The circuit D selects a fresh reference and produces a fresh signal WORD and a fresh pulse READY. The fresh signal WORD gives a fresh signal INFO. As the value of the signal SEQ is still 3, it is still the counter 105 which is loaded with the value of the fresh signal INFO. That fresh value appears at the display element 145. If, as in the example shown in FIG. 11, it is the figure 6 which appears (phase 9), the user can go on to change the following figure, that is to say, the figure corresponding to tens of minutes. For that purpose, he must wait until the monostable circuit 54 produces a fresh pulse, the effect of that being to cause the tens of minutes display element 144 to flash. The user then changes the other figures by means of the same procedure. If the user only wants to change the time zone, that is to say, if he wants to change only the tens of hours and the hours, the will allow the display element 144 to 141 to flash in succession without pronouncing words. Those elements will therefore not be altered (phases 10 and 11).

The functions ALARM and TIMER are controlled in a similar manner, with only the first instruction being changed. It should be noted however that, when it is the function ALARM which is involved, the cycle is automatically re-initialized after the fourth item of digital information has been introduced, as described above with reference to FIG. 8.

It will also be apparent that the watch could comprise other functions, for example a time zone function. That function would make it possible to change the figure displayed by the display elements 146 and 145. For that purpose, the instruction MODE may be of a fourth value (for example 3) corresponding for example to saying the word ZONE. In that case, the decoder includes a supplementary circuit which is similar to the circuit 68 shown in FIG. 8. In that circuit, the gate equivalent to the gate 72 detects the mode ZONE and the gate which is similar to the gate 70 detects the value 4. That circuit thus automatically resets the counter 56 to zero when the function ZONE is actuated and in addition, the first two items of digital information corresponding to tens of hours and to hours have been introduced. Furthermore, the part $160_1$ of the addressing circuit must be slightly modified. The gate 174 must compare the signal MODE not only to 0 (time function) but also to the value corresponding to the function ZONE which in the present example is 3.

The foregoing description relates to the situation where all the informations required for performing the functions of the watch are inputted by means of speech. It will be appreciated that it is possible to provide a hybrid control mode, that is to say, a watch in which certain instructions are introduced by means of speech and other are introduced by conventional control means such as push-buttons or a crown.

The following description relates to the situation where the function MODE and functions starting and stopping (START, STOP) are controlled by means of speech while the digital data relating to those functions are introduced by means of a push-button or any other control device for producing control pulses.

In addition, in order to simplify the description, it has been assumed that the watch displayed only hours and minutes in digital form. The vocabulary of the watch is then limited to WATCH, ALARM, TIMER, START and STOP. The process of identifying the word pronounced is precisely as already described above. The modifications only concern the circuits shown in FIGS. 8 and 9. Before those modifications are described, it should be made clear that a push-button is used simultaneously to introduce the information relating to hours (H) and to tens of hours (DH) and also simultaneously, information relating to minutes (M) and tens of minutes (DM). There is no longer any information relating to seconds. This means that the signal SEQ now assumes only four seperate values instead of eight. For example, it is of a value 0 for the input of the MODE, 1 for input of START and STOP, 2 for the input by means of the push-button of DH and H, and 3 for the input of DM and M by means of the push-button.

Referring now to FIG. 8, the modifications are as follows. The circuit 68 disappears, since there is no longer any seconds information. On the other hand, the circuit 76 is retained. The signal INFO gives only one item of information which is the information START or STOP. The counter 56 is reset to zero as soon as it reaches the value 4 (four instructions only). Finally, the input 28a of the circuit 28 which initially directly received the signal READY is now connected to the output of an OR-gate 700 which at its inputs receives the signal READY and the pulses BP supplied by the push-button for inputting the digital data. In this way, after input of the data relating to hours (DH, H), the user has a period of five seconds for possibly correcting those data before inputting the data relating to minutes (DM, M), by means of the push-button.

Figure 12:
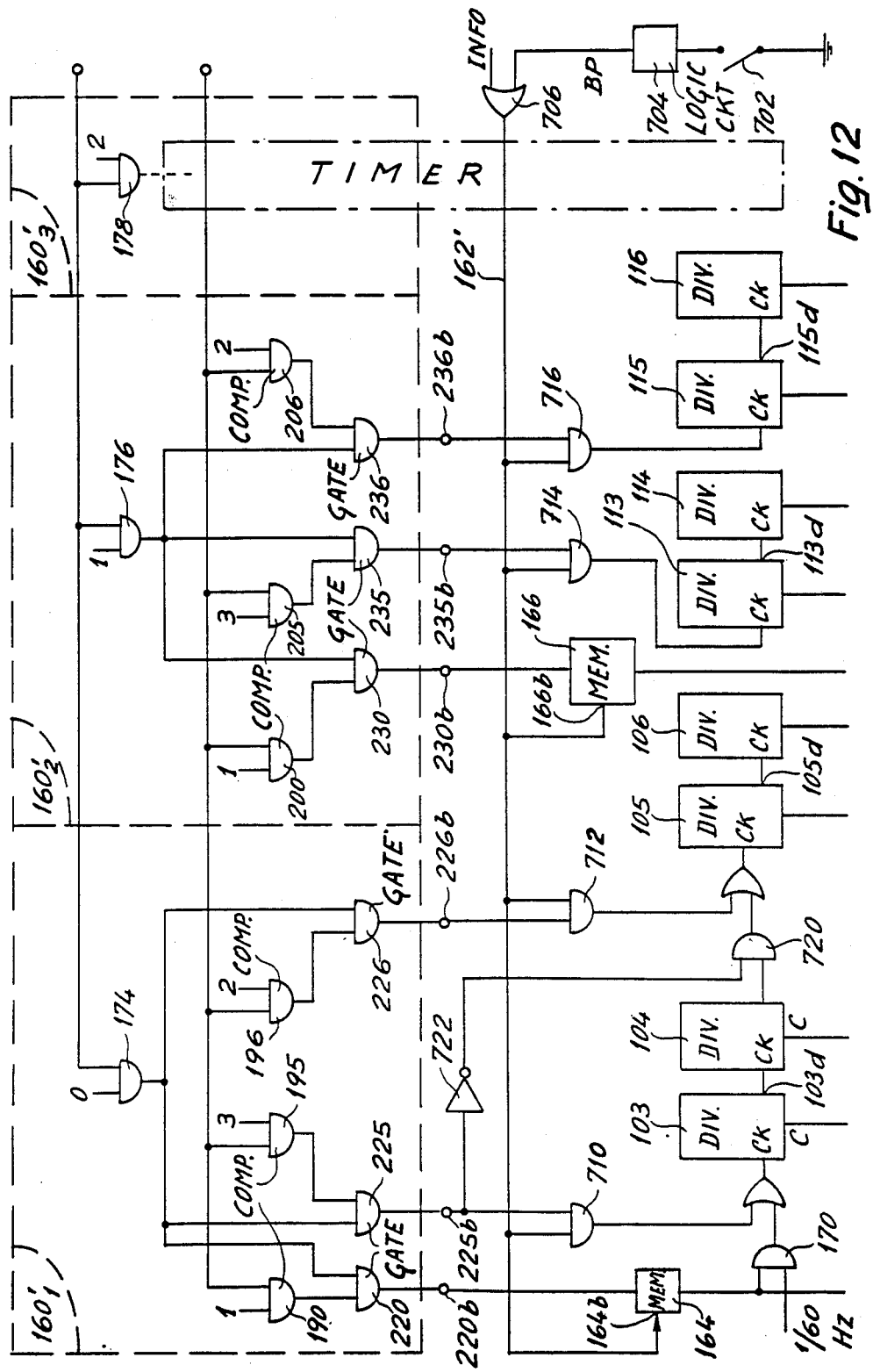
FIG. 12 shows a second embodiment of the control circuit of the watch.

FIG. 12 shows the modifications to be made in the circuit shown in FIG. 9a and 9b. Such modifications are essentially because, instead of giving the counters 101 to 126 instructions in the form of the final state that they are to assume, such instructions are imparted to the counters in the form of pulses which increment the counters. In addition, as already indicated above, the counters H and DH are controlled in series, as also are the counters M and DM.

This circuit comprises the addressing circuits $160'_1$, $160'_2$ and $160'_3$ which are similar to the addressing circuits $160_1$ to $160_3$ in FIGS. 9a and 9b. The number of comparators and the number of AND-gates is of course reduced by virtue of the reduction in the number of digital data to be introduced. The circuit $160'_1$ comprises comparators 190, 196 and 195 and gates 220, 226 and 225. The outputs 220b, 226b and 225b of those gates produce a signal at logic level "1" if the function WATCH is actuated and respectively, if an instruction START, STOP is inputted, if an instruction DH, H is inputted or if an instruction DM, M is inputted. In a similar manner, the addressing circuit $160'_2$ associated with the function ALARM comprises comparators 200, 205 and 206 and AND-gates 230, 235 and 236. The outputs 230b, 235b and 236b of the gates produce a signal at logic level "1" if the mode ALARM is actuated and respectively, if an instruction START, STOP is introduced, if an instruction DH, H is introduced, or if an instruction DM, M is introduced. The circuit $160'_3$ concerning the function TIMER would be of the same construction and is not illustrated in order not to encumber the drawing. The part WATCH comprises memory 164 and counters 103 to 106. The output 103d of the counter 103 is directly applied to the clock input CK of the counter 104 and the output 105d of the counter 105 is directly applied to the clock input CK of the counter 106. The part ALARM comprises counters 113 to 116 and memory 166. The output 113d of the counter 113 is directly applied to the clock input CK of the counter 114 and the output 115d of the counter 115 is applied to the clock input CK of the counter 116. The part TIMER is of precisely the same construction as the part ALARM.

In FIG. 12, reference 702 represents the control member, for example a push-button, and reference 704 represents a logic circuit for converting the control pulses supplied by the button 702 into a number of electrical pulses corresponding to the information introduced by the push-button. Those pulses BP are combined with the signal INFO by means of an OR-gate 706. It should be recalled that the signal INFO contains only the instructions START or STOP. The output of the gate 706 is connected to a line 162' similar to the line 162 in FIGS. 9a and 9b. The line 162' is connected to the control inputs 164b and 166b of the memories 164 and 166 and to that of the memory of the part TIMER. The line 162' is also connected to one of the two inputs of AND-gates 710 and 712 for the part WATCH and 714 and 716 for the part ALARM. The second inputs of those gates are respectively connected to the outputs 225b, 226b, 235b and 236b of the gates 225, 226, 235 and 236. The outputs of the gates 710 to 716 are applied directly to the clock inputs CK of the counters 103, 105, 113 and 115 and the corresponding counters of the part TIMER. As in the embodiment shown in FIGS. 9a and 9b, the gate 170 has one input connected to the output of the memory 164 while its other input receives the clock signal which is at a frequency of 1/60 Hz since there is no seconds display. The connection between the output 104d of the counter 104 and the clock input CK of the counter 105 is by way of an AND-gate 720, the control input of which is connected to the output of the AND-gate 225 by way of the inverter 722. The same structure would be found in regard to the part TIMER. The outputs c of the counters and the memories are connected to the lines 251 to 284, as in FIGS. 9a and 9b. The rest of the circuit is identical to that shown in FIGS. 9a and 9b, with the obvious exception of the multiplexers, decoders and display elements associated with the seconds and tens of seconds, those components having been omitted.

The mode of operation of this second embodiment of the watch is as follows. The function (MODE signal) is controlled precisely as in the first embodiment. Five seconds afterwards, all the display elements begin to flash in order to authorize input of the information START or STOP. The signal SEQ is of a value 1. The user then pronounces the instruction START or STOP. The signal INFO assumes the value 0 or 1 depending on the instruction which has actually been introduced. If, for example, it is the function WATCH which has been actuated, the gate 220 supplies a logic signal at level "1", which opens the memory 164. The value of the signal INFO transmitted by the line 162' is introduced into that memory. Depending on the value of the signal, the gate 170 is opened or closed, which interrupts or transmits the time pulses at a frequency of 1/60 Hz into all the counters 103 to 106 which are disposed in a cascade array. In fact, with the output of the gate 225 being at level "0", the gate 220 is opened whereby the output 104d of the counter 104 is connected to the clock input CK of the counter 105. Five seconds later, the signal SEQ goes to value 2 and there is no longer any signal INFO. With the value of the signal SEQ being 2, the decoders 135 and 136 are then supplied with the 2 Hz signal and the elements 145 and 146 for displaying hours and tens of hours flash to show that the user can operate the push-button 702 to introduce the digital information relating to DH and H. With the value of the signal SEQ being 2, only the gate 226 has its output at logic level "1". The pulses supplied by the circuit 704 associated with the push-button 702 are applied by way of the line 162'. They pass through the gate 712 which is the only gate open and therefore increment the counters 105 and 106. The user terminates his actuation of the button 702 when the elements 145 and 146 display the appropriate information in regard to hours (DH and H). Those pulses are also applied to the input of the circuit 28 in FIG. 8, by way of the OR-gate 700. Those pulses are applied to the input 54a of the monostable circuit 54. After the last pulse has been introduced, the user has a period of five seconds for possibly correcting that information.

At the expiry of that period, the counter 56 is incremented by one unit and the value of the signal SEQ is then 3. It is then the gate 225 which is the only one to produce a signal at a logic level "1". The gate 710 is therefore open while the gate 720 is closed. At the same time, with the value of the signal SEQ being 3, the decoders 133 and 134 receive the 2 Hz signal. The display elements 143 and 144 flash to indicate to the user that he may introduce the minutes information (DM and M). The user actuates the push-button 702 in order for the circuit 704 to produce the number of pulses necessary to display the desired information DM and M. Those pulses pass by way of the line 162' and are therefore applied to the clock input CK of the counter 103 by way of the gate 710 which is in an open condition. Even if the number of pulses increments both the counters 103 and 104 to a value of more than 60, the pulse which should then be applied to the counter 105 is blocked by the gate 720 which is closed. The hours information (DH and H) therefore remains unchanged. Five seconds after the last pulse has been applied, a fresh pulse is applied to the counter 56 which therefore goes to zero. The watch is in a condition for receiving a fresh sequence of instructions.

The function TIMER is controlled in precisely the same manner. The mode of operation in regard to the function ALARM differs from the function WATCH only insofar as no time pulse is to be applied to the counters 113 to 116, outside of the control periods. The counters 113 and 114, and 115 and 116 may be separate and there is no need to provide an isolating gate of the gate 720 type.

The two embodiments described hereinbefore are concerned solely with digital display. It will be appreciated that the invention may be applied to an analog display watch, for example a watch with hands.

FIG. 13 shows an embodiment of a watch having hands for the display of hours and minutes, in which all the control informations are introduced by means of speech. The vocabulary of this watch is therefore identical to that of the first embodiment.

Because the seconds have been omitted (DS and S), the signal SEQ can only assume values of from 0 to 5. With respect to the circuit 28 shown in FIG. 8, the modifications comprise omitting the circuit 68 which is no longer required, and the fact that the counter 56 is reset to zero at the sixth pulse applied to its input.

Relative to FIGS. 9a and 9b, the addressing circuits $160_1$ to $160_3$ and the time counting circuits are modified only insofar as the components relating to the information in respect of seconds and tens of seconds are omitted. It will be appreciated that the AND-gates 170 and 172 have a signal at a frequency of 1/60 Hz applied thereto. The modifications relate to what happens on the other side of the outputs c of the time counters 101 to 126.

FIG. 13 which shows the third embodiment of the watch illustrates the multiplexers 293 to 296 corresponding to the minutes and hours information, with their inputs a, b and c which receive the contents of the time counters corresponding respectively to the functions WATCH, ALARM and TIMER. The multiplexers receive the signal MODE at their control input d. They operate precisely as in FIGS. 9a and 9b. In other words, at their output e they supply digital information in binary form, which corresponds to the position to be occupied by the minutes hand (293, 294) and the hours hand (295, 296), those positions being controlled by the instructions introduced in verbal form by the user.

The hands are driven by a stepping motor 750 which receives pulses from shaper circuit 752 which produces those pulses from drive pulses $I_M$ applied to its input. The drive pulses $I_M$ are produced in the following manner. Drive pulse counters 753, 754, 755 and 756 are formed by dividers disposed in series, with divider ratios of respectively 10, 6, 10 and 2. Those counters respectively correspond to the items of informations DH, H, DM and M. It will be appreciated that there is also a circuit (not shown) which resets the dividers 755 and 756 to zero when the divider 755 receives a fresh pulse, while the dividers 756 and 755 respectively display 1 and 1.

Digital comparators 763 to 766 compare the content of a counter 753 to 756 to the content of the corresponding multiplexer 293 to 296. Each comparator produces a logic signal at level "1" at its output a, if the two numbers applied to its inputs are identical and a signal at logic level "0" in the opposite case. The outputs a of the comparators 763 to 766 are connected to the inputs of a NAND-gate 770. The signal CD which appears at the output of the gate 770 is therefore of a value 0, if the content of all the counters 753 to 756 is identical to that of the multiplexers 293 to 296. A signal $F_M$ at a frequency of 64 Hz, for example produced by the divider stages, is applied to one of the inputs of an AND-gate 772. The other input of that gate is connected to the output of the comparator circuit 774 which compares the value of the signal SEQ to zero. The comparator 774 produces a signal at logic level "1" if the value of the signal SEQ is zero and a signal at logic level "0" in the opposite case. The output of the gate 772 is connected to an input of an AND-gate 776, the other input of which receives the signal CD produced by the gate 770. The gate 776 produces the drive pulses IM which are applied to the input of the shaper circuit 752. The drive pulses are also applied to the clock input CK of drive pulse counter 753.

If the signal SEQ is at 0, the 64 Hz pulses are applied to the input of the gate 776. If the signal CD is of a value 1, then in effect there are drive pulses IM which are formed by the pulses of the 64 Hz signal and those pulses also serve to increment the counters 756 to 753. It will be readily appreciated that the contents of the counters 753 to 756 represent the real positions that the hands are to reach. The power supply to the motor 750 is stopped when the content of the counters 753 to 756 is identical to that of the multiplexers 293 to 296.

This stop is produced by the gate 776 closing when the signal CD goes to zero, that is to say, precisely when there is a condition of identity between the above-mentioned contents. It should be noted that the drive pulses are produced only when the value of the signal SEQ is zero.

It is apparent moreover that, after the introduction of each item of information by means of speech, the user must be able to check that the information introduced has been properly understood by the watch, and that the user must also be informated of the moment at which he can introduce the following item of information. In the arrangement shown in FIGS. 9a and 9b, these two types of information are supplied for the user by the display elements 141 to 146 and 151 to 153.

In the case of a watch with hands, the watch does not have such display elements in most cases. In this third embodiment, the above-mentioned information is supplied in sound form. As shown in FIG. 13, the watch comprises a voice circuit 780 which controls the electroacoustic transducer 10.

Such a circuit is fully known in the timepiece art. There is therefore no need for it to be described in detail. It stores information which makes it possible to produce electrical signal which once applied to the loudspeaker 10, give a sound signal corresponding to the word associated with the stored information. The circuit 780 can store n groups of information associated with addresses, each group of information making it possible to speak back a word of the vocabulary. In order to cause a word to be spoken back, the value of the address associated with the group of information representing the word to be produced merely has to be applied to the address input 780a of the circuit. This circuit must therefore be able to speak back the entire vocabulary of the watch. It must also produce a particular signal when a fresh item of data can be introduced, for example a "bip". It may be advantageous for that circuit also to produce the alarm signal when the gate 289 produces the sound alarm control signal.

The addresses are produced by a coding circuit 779 which receives the signals MODE, SEQ and INFO at its inputs.

There is no need to explain in greater detail that the circuit 779 is to cause speaking back one of the words WATCH, ALARM and TIMER, depending on the value of the signal MODE when the value of the signal SEQ is zero and irrespective of the value of the signal INFO; that it is to speak back one of the words START and STOP, depending on the value of the signal INFO, if the value of the signal SEQ is 1, irrespective of the value of the signal MODE; that it is successively to speak back one of the figures from zero to nine, depending on the value of the signal INFO, for values of the signal SEQ of from 2 to 5, irrespective of the value of the signal MODE; and finally, it must cause the production of a "bip" upon each change in the value of the signal SEQ.

The mode of operation of this third embodiment of the watch is as follows. The user pronounces the name of one of the functions. The corresponding value of the signal MODE is applied inter alia to the control inputs of the multiplexers 293 to 296 and to an input of the decoder 780. As the value of the signal SEQ is zero, the voice circuit produces the word corresponding to the item of information contained in the signal MODE. At he same time, the gate 772 is opened. However, as no fresh item of information has been loaded into the counters 103 to 126, that is to say, into the multiplexers 293 to 296, the value of the signal CD is zero. The gate 776 is closed and the motor is not supplied with power. If the word spoken back by the voice circuit corresponds to that pronounced by the user, the signal SEQ goes to a value 1 at the end of a period of five seconds and the circuit 780 emits a "bip". The user can then introduce the second instruction START or STOP. The value of the signal SEQ being 1, no drive pulse can be applied to the motor 750. The voice circuit 780 causes the word START or STOP to be emitted, depending on the value of the signal INFO. If the word spoken back is wrong, the user has a period of five seconds to correct the word. After the period of five seconds has expired without a word being introduced, the signal SEQ goes to a value 2. The voice circuit 780 therefore emits a "bip" indicating to the user that he can introduce the figure corresponding to the information in respect of tens of hours. The user pronounces that word and the circuit 780 produces the figure corresponding to the value ot the signal INFO. At the same time, the value is introduced into that one of the counters 106, 116 and 126 which has been selected by the addressing circuit 160, on the basis of the value of the signal MODE. That value is introduced into the multiplexer 296 which is therefore at a value different from that of the counter 756, and the signal CD is therefore at a value 1. However, as the value of the signal SEQ is 2, no drive pulse is applied to the motor. The hands of the watch therefore do not move. If the figure spoken back by the circuit 780 is appropriate, the cycle is continued until the four items of digital data have been introduced. After the fourth item has been introduced, the multiplexers 293 to 296 are loaded to the values that the user wishes to see displayed by the watch.

When the five second period has elapsed, the signal SEQ goes back to zero. At that moment, on the one hand the voice circuit 780 emits a "bip" to indicate that a fresh instruction introduction cycle can begin and, on the other hand, the gate 772 is opened since the value of the signal SEQ is zero. As moreover, the multiplexers 293 to 296 have different contents from the drive pulse counters 753 to 756, the value of the signal CD is 1 and the gate 776 is opened. Drive pulses IM are applied to the shaper circuit 752, which causes the hands to move forward quickly. Those pulses are applied to the counters 753 to 756 until the signal CD goes back to zero, that is to say, until there is again a condition of identity between the reference value (multiplexers) and the value displayed by the hands (counters 753 to 756).

In the foregoing description, the voice circuit 780 emits the same "bip" whenever the signal SEQ changes in value. It would be easily possible to arrange the decoder 779 and the voice circuit 780 in such a way that the voice circuit produces a different sound signal for each change in the value of the signal SEQ, in order for the user also to be informed of the instruction which he is to introduce, for example the figure representing tens of hours or the figure representing units of minutes.

In the third embodiment involving an analog display watch, the user is informed by a sound signal that the speech coding circuit D has retained the proper word. In a fourth embodiment, which involves an analog watch, that confirmation information is given by the hands themselves, which take up a particular position on the dial, each position corresponding to an item of information introduced by means of speech.

Figure 14A:
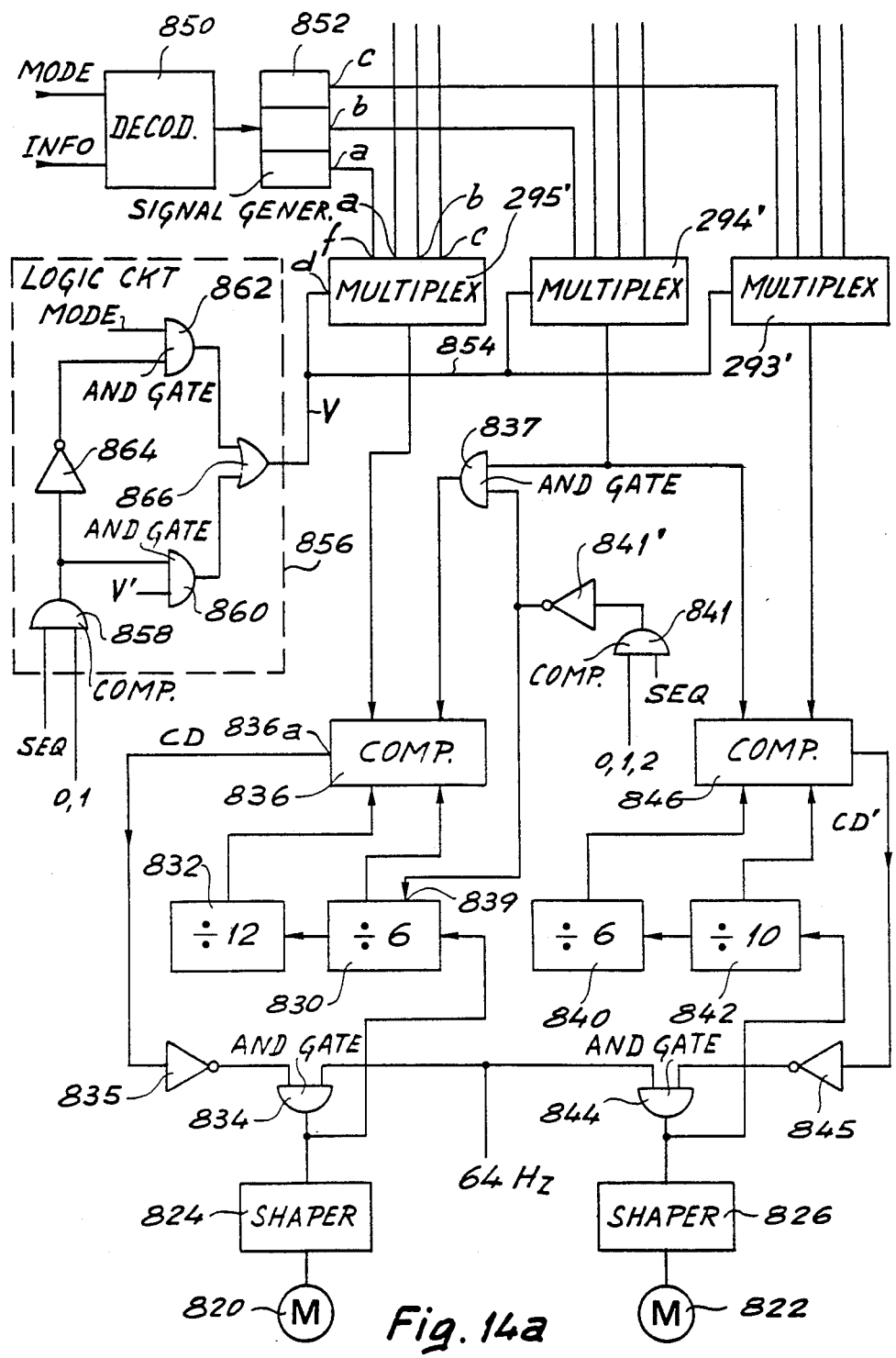
FIG. 14a shows a fourth embodiment of the control circuit of the watch.
Figures 14B, 14C:
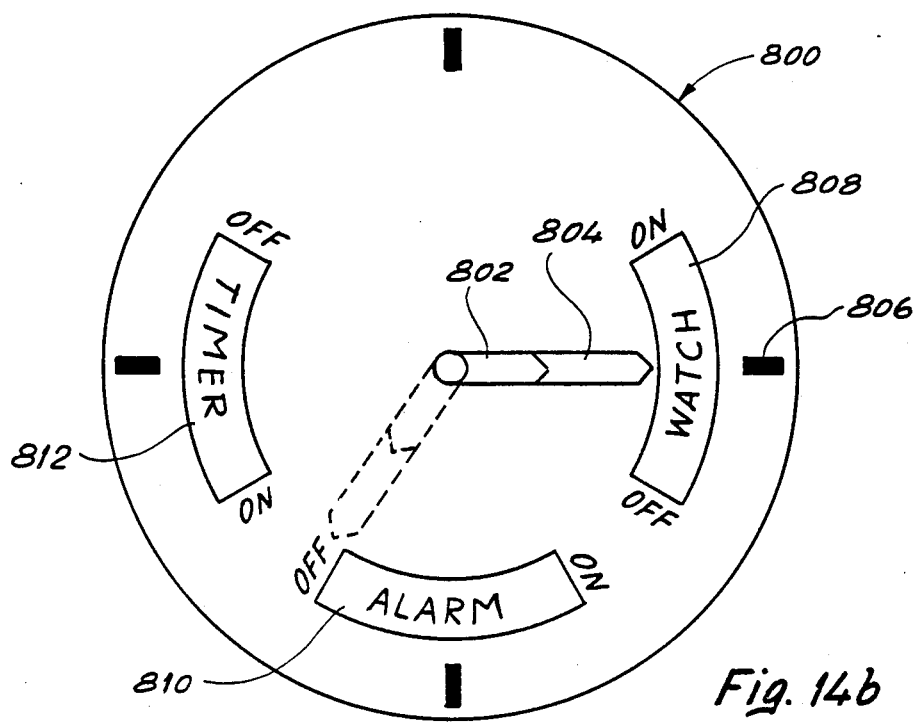
FIG. 14b shows a mode of displaying the instructions given to the watch, in the fourth embodiment.
FIG. 14c shows a table of coding of the control signal, to produce the display mode shown in FIG. 14b.

FIG. 14b illustrates one possible form of such a display. FIG. 14b shows the dial 800, the hours hand 802 and the minutes hand 804. The dial bears the usual hours markings indicated at 806. It also bears particular items WATCH, ALARM, TIMER, as indicated at 808, 810 and 812 and the words ON and OFF, representing START and STOP, in respect of each of those items 808, 810 and 812.

For example, WATCH corresponds to 3 o'clock; WATCH ON corresponds to 2 o'clock; WATCH OFF corresponds to 4 o'clock; ALARM corresponds to 6 o'clock, ALARM ON corresponds to 5 o'clock; ALARM OFF corresponds to 7 o'clock; etc. In addition the hands are controlled in such a way that the two hands 802 and 804 are superposed, for the purposes of indicating the above-mentioned information. That corresponds to abnormal positions of the hands, thereby attracting the user's attention.

In this embodiment, the instruction for controlling the hours display involves one operation, that is to say, the items of information relating to DH and H are combined. This means that the vocabulary of the watch further includes the numbers TEN and ELEVEN. This also means that the signal SEQ can only assume five values of from 0 to 4, the value 2 corresponding to the introduction of hours (DH and H), the value 3 corresponding to the introduction of tens of minutes (DM) and the value 4 corresponding to the minutes (M). In this embodiment, the circuit shown in FIG. 8 must be modified in the following manner. The circuit 68 must be omitted and the counter 56 is reset to zero by the fifth pulse applied to its input 56a.

If reference is made to FIG. 9a and 9b, the addressing circuits $160_1$, $160_2$ and $160_3$ are simplified since each of those circuits now only comprises comparators at values 1, 2, 3 and 4 in respect of the signal SEQ. The groups of counters 101 to 126 are also modified since for each function there are only the counters corresponding to DH and H, DM and M. The memories 164, 166 and 168 are retained. The display and display control assembly is of course completely altered, and is shown in detail in FIG. 14a.

The display and display control assembly comprises three multiplexers 293', 294' and 295'. The multiplexer 293' which corresponds to the hours information receives at its inputs a, b and c, the outputs c in respect of the state of the counters corresponding to the information DH and H for the three functions. Likewise, the multiplexer 294' receives at its three inputs a, b and c the outputs in respect of the states of the counters corresponding to the information DM, and the multiplexer 293' receives the outputs in respect ot the states of the counters corresponding to the information M. Each multiplexer has a fourth input f, the purpose of which will be described in detail hereinafter. The time information is displayed by means of two hands, each hand being controlled by an independent motor. In FIG. 14a, the motors are denoted by reference numeral 820 (hours hand) and reference numeral 822 (minutes hand). Shaper circuits 824 and 826 are associated with the motors 820 and 822.

The drive pulses applied to the motors are produced substantially as in the third embodiment. The drive pulses for the motor 820 are produced by the circuit comprising a divider 830 which has a divider ratio of 6 and the output of which is connected to the clock input of the divider 832 which has a divider ratio of 12, comparator 836 which receives at its inputs the states of the multiplexers 295' and 294' on the one hand, and the states of the dividers 830 to 832, on the other hand, and an AND-gate 834. The output 836a of the comparator 836 produces a comparison signal CD at a logic level "1" when the values applied to its two groups of inputs are identical, and a signal at logic level "0" in the opposite situation. The signal CD is applied to an input of the gate 834 by way of an inverter 835, the other input receiving a signal at a frequency of 64 Hz which is supplied by the divider 4 (FIG. 1) of the watch. The output of the gate 834 is connected, on the one hand, to the clock input of the divider 830 and, on the other hand, to the input of the shaper circuit 824.

A already described above, when the states of the multiplexer 295' and the divider 832 are identical and the states of the multiplexer 294' and the divider 830 are also identical, the value of the signal CD is 1 and the gate 834 is in a non-conducting condition. Neither the motor 820 nor the dividers receive the 64 Hz signal. On the other hand, if the above-mentioned states are different, the 64 Hz pulses are applied to the dividers and the motor until the states thereof are again identical. The divider with the divider ratio of 12 obviously corresponds to the time information (DH and H). If the arrangement did not include the divider with a divider ratio of 6, the hours hand which is controlled by the motor 820 would assume a position precisely corresponding to an hour marking (for example 6 o'clock), without that position being affected by the position of the minutes hand. For example, at a time of 6.58, the hours hand would be precisely on the marking at 6 o'clock. The divider 830 is simply provided to adjust the position of the hours hand in dependence on the position of the minutes hand. Preferably, the state of the multiplexer 294' is applied to one of the groups of inputs of the comparator 836 by way of an AND-gate 837. A comparator 841 compares the value of the signal SEQ to the values 0, 1 and 2 and produces a signal at logic level "1" only, if the signal SEQ is equal to one of those three values. The output of the comparator 841 is connected to the control input of the gate 837 by an inverter 841'. In addition, the output of the inverter 841' is applied to the zero resetting input 839 of the divider 830. It will be seen therefore that, if the value of the signal SEQ is 0, 1 or 2, the gate 837 is in a non-conducting condition and the divider 830 is reset to zero. In other words that means that, when instructions in respect of MODE and START, STOP are introduced, the comparator 836 compares only the content of the multiplexer 295' and the divider 832. It is this that permits the hours hand and the minutes hand to be moved into the positions shown in FIG. 14b. Likewise, when the hours information (DH and H) is introduced, that is to say, when the signal SEQ is 2, the comparison operation performed does not relate to the content of the multiplexer 294' and the divider 830. This means that the hours hand takes up a position precisely opposite the minutes marking only when there is information relating to tens of minutes.

The means for controlling the motor 822 for the minutes hand is entirely similar to that for the motor 820. The arrangement includes a divider 840 with a divider ratio of 6, and a divider 842 with a divider ratio of 10, which are associated with the comparator 846 for comparing the state of the multiplexers 293' and 294' and the dividers 840 and 842. The comparison signal CD' is applied by way of an inverter 845 to control a gate 846 similar to the gate 834 which transmits or stops the 64 Hz pulses. The motor is supplied with power until the state of the dividers 840 and 842 is identical to that of the multiplexers 293' and 294'.

As already described above, each multiplexer 293' to 295' has a fourth input f which permits the hands to be moved into the predetermined positions shown in FIG. 14b in order to display the mode of operation understood by the watch and the state of operation of that mode (START and STOP). A decoder 850 receives the signal MODE and the signal INFO at its inputs. The decoder produces a signal for controlling a binary digital signal generator 852. The generator 852 contains the digital values which permit the hours and minutes hands to be set into the positions defined in FIG. 14b, in dependence on the value of the signals MODE and INFO. The generator 852 has three outputs a, b and c which respectively produce the digital values corresponding to the information DH and H, DM and M. The output a is connected to the input f of the multiplexer 295', the output b to the input f of the multiplexer 294' and the output c to the input f of the multiplexer 293'. FIG. 14c sets out the table showing correspondences between the value of the input signal of the decoder 850 and the value of the signals at the outputs a, b and c of the generator 852.

The multiplexers are controlled by a signal V which is applied to the control inputs d of the multiplexers by way of line 854. The signal V is produced by a logic circuit 856 comprising a comparator 858 which produces a logic signal at level "1" when the value of the signal SEQ is 0 or 1. The output of the comparator 858 is connected, on the one hand, to an input of an AND-gate 860 and, on the other hand, to an input of an AND-gate 862, by way of an inverter 864. The second inputs of the gates 860 and 862 respectively receive the signal MODE and a signal V'. The signal V' is of the same nature as the signal MODE, but is of a value 3 for example, the signal MODE being capable of being of values 0, 1 and 2. The outputs of the gates 860 and 862 are connected to the inputs of an OR-gate 866. The output of the gate 866 produces the signal V. It will be readily understood that the circuit 856 is a change-over switching means which gives the signal V the value of the signal V' if the value of the signal SEQ is 0 or 1 and which gives the signal V the value of the signal MODE in the opposite situation.

Depending on, whether the signal applied to the control input c of a multiplexer is 0, 1, 2 or 3, it is the signal at the input a, b, c or f which is applied to the output of the multiplexer.

It should be noted that the watch also comprises a circuit (not shown) for detecting changes in the value of the signal SEQ and for causing the emission of a "bip" by the loudspeaker as soon as such a change is detected.

The mode of operation of the fourth embodiment of the watch will be clearly evident from the foregoing description.

The user pronounces the first function instruction. The circuit 28 produces a signal MODE which is at a value of from 0 to 2 depending on the word recognized by the decoding circuit, and a signal SEQ which is at a value 0. The signal MODE is applied to the input of the decoding circuit 850. The outputs a, b and c of the generator 852 apply to the inputs f of the multiplexers the digital values corresponding to the MODE recognized, in accordance with the table shown in FIG. 14c. As the value of the signal SEQ is 0, the gate 837 is non-conducting and the divider 830 is at zero, while the value of the signal V is 3. It is therefore the digital values applied to the inputs f of the multiplexers, which are applied to one of the groups of inputs of the comparators 836 and 846. When the comparators detect that there is not a condition of coincidence, drive pulses are applied to the motors 820 and 822 until a condition of coincidence is again attained. The hands then occupy that one of the positions shown in FIG. 14b, which corresponds to the function recognized in the coding circuit of the watch. The user can thus check whether the watch has properly understood his instruction. The user has a period of five seconds to make any correction that may be required. At the end of the five second period, the loudspeaker 10 produces a "bip" to indicate to the user that he can now introduce the instruction START or STOP. With the value of the signal SEQ then being 1, the mode of operation is similar to that just described above. The difference is that the two hands then move into that one of the positions shown in FIG. 14b which corresponds to the combination of the value of the signal MODE and the value recognized in respect of the signal INFO. After a period of five seconds has passed, a second "bip" indicates to the user, that he can introduce the hours information (DH and H). The value of the signal SEQ is then 2. It is therefore the signal MODE which is applied to the control input d of the multiplexers and the gate 837 is non-conducting and the divider 830 is reset to zero. The signal INFO assumes a value which corresponds to the number of hours recognized by the watch. That value is loaded into the multiplexer 295'. The detector 836 detects that there is a difference between the states of the multiplexer 295' and the divider 832. Pulses at a frequency of 64 Hz are then applied to the motor 830 and the dividers 820 and 832 until the comparator detects identity. The hours hand moves into a position which corresponds to the value of the signal INFO. The user can thus check whether the watch has properly understood the instruction that he gave it. He has a period of five seconds for introducing any correction that may be required.

The user then introduces the instruction in respect of tens of minutes (DM). The value of the signal SEQ is 3. The signal V is therefore equal to the signal MODE and the gate 837 is no longer in a non-conducting condition, nor is the divider 830 reset to zero. The value of the signal INFO appears at the outputs of the multiplexer 294'. The comparators 836 and 846 therefore detect that the two groups of inputs thereof are at different values. The gates 834 and 846 therefore detect that the two groups of inputs thereof are at different values. The gates 834 and 844 are opened and drive pulses are applied to the two motors and to the two groups of dividers. As regards the hours hand (motor 820), the 64 Hz pulses are applied until the dividers 832 and 830 have the same content as the multiplexers 294' and 295'.

There is therefore a slight movement of the hours hand in order to take account of the number of tens of minutes involved. As regards the motor 822, it receives pulses until the contents of the multiplexer 294' and the divider 840 are identical. The minutes hand therefore moves into a position which corresponds to the right information in respect of tens of minutes, but information in respect of units of minutes which is probably wrong, since this is information corresponding to the display of previous items of information.

Finally, the user introduces the information in respect of units of minutes, which appears at the multiplexer 293'. The gate 844 is therefore opened and pulses are applied to the divider 842 and to the motor 822. If the information initially contained in the counter 842 is less than the instruction in respect of units of minutes, only the counter 842 is incremented and the minutes hand is moved by a fraction of tens of minutes. If on the other hand the above-mentioned instruction is less than the initial content of the divider 842, the minutes hand performs a complete revolution of the dial, less the difference between the instruction given and the initial content.

It should be made clear that, in this embodiment, the hands are caused to move after each time instruction has been introduced. This is made possible by using two separately controlled motors. In fact, even in the most disadvantageous case, there will be at most 59 pulses at a frequency of 64 Hz to be counted, which therefore takes about one second.

It will be seen from the whole of the foregoing description that the control system according to the invention makes it possible to very substantially simplify controlling the different functions of the watch and introducing the corresponding data. It will be clearly seen that, by virtue of the direct relationship between the different words of the vocabulary of the watch and the instructions to be given to the watch, any use of the memory is virtually eliminated, which makes the use of such a watch much more attractive.

It should be added that this control system is suited both to controlling a part of the functions of the watch and controlling all those functions. Moreover, the control system applies equally well to an analog display watch and a digital display watch. Finally, the watch can give the user confirmation of the instruction as understood by the watch, either in visual form (digital or analog display) or in acoustic form.

It should also be added that the functions performed by the circuits shown in FIGS. 8, 9, 12, 13 and 14a could also be performed by the structure described with reference to FIG. 2, either by adding a group of suitable programs for the processor or by including a second processor dedicated to that purpose, containing only the programs corresponding to those functions.

What is claimed is:

1. A spoken command sensitive watch wherein a vocabulary of spoken commands is capable of controlling a plurality of functions according to one out of a plurality of possible sequences of commands, each of said sequences comprising a first command for selecting a function and at least two subsequent time information commands, said watch comprising:

a time base generator;

a frequency divider connected to said time base generator;

spoken command analysing means for converting said spoken commands into binary representations thereof;

memory means for storing binary reference representations of all the spoken commands of said vocabulary;

means for comparing said binary representations of spoken commands with said binary reference representations stored in said memory means;

means for selecting among said stored binary reference representations the compared reference representation which is closest to the respective instant representation of spoken command;

a control circuit responsive to said frequency divider and to said selecting means for performing the operations corresponding to selected stored binary reference representations;

means for causing the control circuit to (a) initially assume a configuration corresponding to the performance of one out of said plurality of selectable functions of said watch in response to at least said first spoken command in said sequence of commands, said first spoken command being selected among the commands of said vocabulary pertaining to said functions, and (b) subsequently perform time information operations corresponding to the so selected function in response to subsequent spoken commands in the sequence of commands after the control circuit has assumed the desired configuration, each of said subsequent spoken commands being selected among a plurality of possible spoken commands in said vocabulary pertaining to time information, said means for causing including means for (a) associating a first control signal to at least the first binary reference representation selected by said selecting means, wherein said control circuit is responsive to said first control signal for assuming a configuration corresponding to the performance of said selected function of said watch; and, (b) associating a plurality of second control signals to subsequent binary reference representations selected by said selecting means, wherein said control circuit is responsive to said plurality of second control signals for performing time information operations corresponding to said previously controlled given function;

display means controlled by said control circuit for displaying symbols corresponding respectively to said functions of the watch and to at least two time digits; and means for associating each of said second control signals to distinct time information operations and corresponding time digits of said display means.

2. The watch of claim 1, further comprising means for producing an acknowledging pulse each time a stored binary reference representation is selected by said selecting means; time delay setting means triggered by each of said acknowledging pulses for generating sequencing pulses after elapse of the time period set thereby, and wherein said means for associating each of said second control signals to a distinct time information operation comprises counting means for counting said sequencing pulses, the output of said counting means being connected to said control circuit for applying a sequencing signal thereto, the binary value of which is representative of the position of the corresponding time information instruction in said sequence.

3. The watch of claim 2 wherein said means for associating each of said second control signals to distinct time information operations further comprises storing means for storing at least one number corresponding to the number of time setting instructions involved in the achievement of a function of the watch, comparing means for comparing the contents of said storing means with the contents of said counting means, and reset means for resetting said counting means when said comparing means ascertains equality between both contents.

4. The watch of claim 2 including means for informing the user of the instruction that he is to introduce in the watch comprising means for allowing said display means to flash.

5. The watch of claim 2 including said means for informing the user of the instruction that he is to introduce in the watch comprising an electro-acoustic sound transducer.

6. The watch of claim 1, wherein said spoken command analysing means comprises:

means for converting spoken commands into an analog signal;

means for filtering said analog signal in a plurality of band pass filters of different frequencies, to provide a plurality of filtered analog signals;

means for sampling said filtered analog signal; and means for comparing each sample of each filtered signal to a threshold and for allocating to each sample a first digital value if said sample is of an amplitude which is greater than said threshold, and a second digital value in the opposite case, the whole of said digital values in respect of the samples associated with the same analog signal forming said binary representation of spoken commands.

7. The watch of claim 6, comprising first processing means for sequentially detecting in each filtered signal an isolated sample having said second digital value surrounded by two samples having said first digital value and for allocating to said isolated sample said first digital value, means for then sequentially detecting in each filtered signal an isolated sample having said second digital value and for allocating said second digital value to said isolated sample.

8. The watch of claim 6, comprising second processing means comprising means for sequentially comparing the digital value of each of the plurality of filtered signals at one sampling moment to the value of the filtered signals at the preceding sampling moment, means for producing a transition signal whenever the comparison means detect a difference, means for counting the number of sampling moments after the production of a transition signal without a fresh transition signal appearing, and means for suppressing the samples of the filtered signals after said number has reached a predetermined value and until a fresh transition signal appears, the whole of the digital values of the conserved samples associated with the same analog signal forming said binary representation of spoken commands associated with the same signal forming said digital signal.

9. The watch of claim 8, further comprising means for memorizing the conserved samples of the plurality of filtered signals corresponding to the same sampling moment if said samples are overall different from those of the preceding sampling moment and for allocating to each memorized group of samples an information representing the position of the memorized group of samples with respect to the chronological succession of the groups of conserved samples.

10. The watch of claim 2, for displaying at least two functions, wherein the control circuit comprises at least two series of counters, each series being associated with a function and comprising as many counters as there are instructions in respect of time information for the function, an addressing circuit responsive to the value of the first control signal and to the value of the sequencing signal; said addressing means comprising means for selecting from said counters that which is associated with said instruction in respect of time information and with the function defined by said first control signal and the sequencing signal when the latter is of a value associated with a time information instruction and loading means comprising means for loading the counter selected by the addressing circuit to the value of the second control signal present.

11. The watch of claim 10, wherein said time information instructions comprise a start instruction and a stop instruction for the watch, said control circuit further comprising at least two condition memories, each said memory being associated with one of said functions, said addressing circuit further comprising means responsive to the first control signal and to said sequencing signal for selecting from said memories that which is associated with the function defined by the value of the first control signal when the sequencing signal is of the value corresponding to the introduction of said start or stop instruction, and said loading means further comprising means for loading the memory selected by the addressing circuit to the value of the second control signal.

* * * * *